United States Patent
Wu et al.

(10) Patent No.: US 12,273,925 B2
(45) Date of Patent: Apr. 8, 2025

(54) RANDOM ACCESS METHOD AND APPARATUS

(71) Applicant: HUAWEI TECHNOLOGIES CO., LTD., Shenzhen (CN)

(72) Inventors: Yiqun Wu, Shanghai (CN); Shuangshuang Xing, Shenzhen (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 411 days.

(21) Appl. No.: 17/517,362

(22) Filed: Nov. 2, 2021

(65) Prior Publication Data
US 2022/0061101 A1 Feb. 24, 2022

Related U.S. Application Data

(63) Continuation of application No. PCT/CN2020/081470, filed on Mar. 26, 2020.

(30) Foreign Application Priority Data
May 3, 2019 (CN) .................. 201910377204.X

(51) Int. Cl.
H04W 74/0833 (2024.01)
H04W 72/23 (2023.01)

(52) U.S. Cl.
CPC ....... *H04W 74/0833* (2013.01); *H04W 72/23* (2023.01)

(58) Field of Classification Search
CPC . H04L 27/2647; H04L 5/0023; H04L 5/0044; H04L 5/0048; H04L 5/0053;
(Continued)

(56) References Cited

U.S. PATENT DOCUMENTS 11,723,073 B2 * 8/2023 Yao .................. H04W 72/0446
370/329
2014/0133430 A1 5/2014 Yang et al.
(Continued)

FOREIGN PATENT DOCUMENTS

CN 106105366 A 11/2016
CN 108702645 A 10/2018
(Continued)

OTHER PUBLICATIONS

MCC Support, Draft Report of 3GPP TSG RAN WG1# 96b v0.1.0(Xi''an, China, Apr. 8-12, 2019 ), 3GPP TSG RAN WG1 Meeting#97, Reno, USA, May 13-17, 2019, 158 pages.
Zte, Sanechips, On 2-Step RACH Procedures. 3GPP TSG RAN WG1 Meeting #96bis, Xi'an, China, Apr. 8,-Apr. 12, 2019, R1-1903879, 10 pages.
(Continued)

*Primary Examiner* — Stephen J Clawson
(74) *Attorney, Agent, or Firm* — Rimon PC

(57) ABSTRACT

This application provides a random access method and an apparatus. The random access method includes: User equipment sends a random access message of a first-type random access procedure to a network device. The random access message of the first-type random access procedure includes a random access preamble and uplink data. The user equipment starts a first time window after the end of the transmission of the random access preamble, and detects first downlink control information (DCI) and second DCI within the first time window. The first DCI is used to schedule a first physical downlink shared channel PDSCH for carrying a first response message to the random access preamble, and the second DCI is used to schedule a second PDSCH for carrying a second response message to the random access message.

18 Claims, 11 Drawing Sheets

(58) Field of Classification Search
CPC ............... H04L 5/0082; H04L 5/0091; H04W 28/0268; H04W 72/23; H04W 74/006; H04W 74/0833; H04W 74/0836; H04W 74/0838
See application file for complete search history.

(56) References Cited

U.S. PATENT DOCUMENTS

| | | | |
|---|---|---|---|
| 2018/0199314 A1* | 7/2018 | Takeda | H04L 1/1822 |
| 2019/0223157 A1* | 7/2019 | Hwang | H04W 74/0833 |
| 2020/0267773 A1* | 8/2020 | Islam | H04W 74/0833 |
| 2021/0076416 A1* | 3/2021 | Shah | H04W 74/006 |
| 2021/0144754 A1* | 5/2021 | Xu | H04W 74/0833 |
| 2021/0259027 A1* | 8/2021 | Deogun | H04W 72/0453 |

FOREIGN PATENT DOCUMENTS

| | | |
|---|---|---|
| CN | 111586881 A | 8/2020 |
| KR | 20190032476 A | 3/2019 |
| WO | 2015139318 A1 | 9/2015 |
| WO | 2018184476 A1 | 10/2018 |

OTHER PUBLICATIONS

LG Electronics, "Discussion on RAR detection in 2-step Rach," 3GPP TSG RAN WG1 Meeting #96bis, Xian, China, Apr. 8-12, 2019, R1-1904199; 3 pages.

Nokia, Nokia Shanghai Bell, 2-step RACH Procedure Feature lead summary. 3GPP TSG RAN WG1 #96bis, Xi an, China, Apr. 8-12, 2019, R1-1905764, 94 pages.

ZTE Corporation, Sanechips, New work item: 2-step RACH for Nr. 3GPP TSG RAN Meeting #82, Sorrento, Italy, Dec. 10-13, 2018, RP-182894, 5 pages.

3GPP TS 38.321 V15.5.0 (Mar. 2019), 3rd Generation Partnership Project; Technical Specification Group Radio Access Network; NR; Medium Access Control (MAC) protocol specification(Release 15), 78 pages.

Chairman, Draft Agenda. 3GPP TSG RAN WG1 #96bis, Xi an, China, Apr. 8, 12, 2019, R1-1903840, 7 pages.

3GPP TS 38.213 V15.5.0 (Mar. 2019), 3rd Generation Partnership Project; Technical Specification Group Radio Access Network; NR; Physical layer procedures for control(Release 15), 104 pages.

Ericsson, NR two-step random access procedure. 3GPP TSG-RAN WG1 NR adhoc, Spokane, USA, Jan. 16-20, 2017, R1-1700300, 4 pages.

* cited by examiner

RANDOM ACCESS METHOD AND APPARATUS

CROSS-REFERENCE TO RELATED APPLICATIONS

This application is a continuation of International Application No. PCT/CN2020/081470, filed on Mar. 26, 2020, which claims priority to Chinese Patent Application No. 201910377204.X, filed on May 3, 2019. The disclosures of the aforementioned applications are hereby incorporated by reference in their entireties.

TECHNICAL FIELD

This application relates to the communications field, and more specifically to a random access method and an apparatus in the communications field.

BACKGROUND

With rapid development of ultra-reliable low-latency (ultra reliable low latency, URLLC), machine type cornification (MTC), and an internet of things (internet of things, IoT) in the future, data transmission that requires sparse packets, small packets, and low latency is also applied to increasing scenarios. To transmit such data, a two-step (2-step) random access channel (RACH) solution is proposed.

A main idea of the 2-step RACH solution is to combine the first step and the third step in the conventional four-step (4-step) RACH solution into one step, and combine the second step and the fourth step in the conventional 4-step RACH solution into one step. Therefore, in the 2-step RACH solution, a random access procedure is greatly accelerated. In a 2-step RACH method, a terminal device first sends a MsgA, where the MsgA includes a random access preamble (random access preamble) and an uplink shared channel (PUSCH); and then, the terminal device receives a response MsgB that is corresponding to the MsgA and that is sent by a network side.

As shown in FIG. 1, in a conventional 4-step RACH procedure, after sending a random access preamble (preamble for short), a terminal starts a RAR window (random access response window), and detects response information RAR for the preamble within the RAR window. After receiving the RAR, the terminal sends a PUSCH carrying a Msg3 (a message 3) to a network device, starts a contention resolution timer (contention resolution timer, which is equivalent to a contention resolution window) after sending the PUSCH, and within the contention resolution window, detects downlink control information (DCI) that is used to schedule a PDSCH carrying contention resolution information. A start position of the RAR window is the first PDCCH moment after the preamble is transmitted. A length of the RAR time window is configured by using a system message. A start position of the contention resolution timer is the first orthogonal frequency-division multiplexing (OFDM) symbol after the PUSCH is transmitted. A length of the contention resolution timer is configured by using a system message.

It can be learned from FIG. 1 that, in the 4-step RACH procedure, the RAR window and the contention resolution window are started in different time periods, to obtain the response to the preamble and a response to the PUSCH sent in step 3. However, the 2-step RACH procedure is different from the 4-step RACH procedure, and how to obtain a response to the MsgA in the 2-step RACH is not resolved in the conventional technology.

SUMMARY

This application provides a random access method and an apparatus, to obtain a response to a MsgA in a 2-step RACH procedure.

According to a first aspect, a random access method is provided, including:

User equipment sends a random access message of a first-type random access procedure to a network device. The random access message of the first-type random access procedure includes a random access preamble and uplink data.

The user equipment starts a first time window after transmission of the random access preamble ends, and detects first downlink control information (DCI) and second DCI within the first time window. The first DCI is used to schedule a first physical downlink shared channel (PDSCH) for carrying a first response message for the random access preamble, and the second DCI is used to schedule a second PDSCH for carrying a second response message for the random access message.

In a design of the first aspect, the user equipment starts the first time window at the first symbol of a first control channel resource set, or the user equipment starts the first time window at the first symbol of a second control channel resource set. The first control channel resource set is a control channel resource set after the transmission of the random access preamble ends, and the second control channel resource set is a control channel resource set after transmission of the uplink data ends.

In a design of the first aspect, the first control channel resource set is a control channel resource set that first meets a first preset condition after the transmission of the random access preamble ends; and/or the second control channel resource set is a control channel resource set that first meets a second preset condition after the transmission of the uplink data ends.

The first preset condition is that a time-domain interval between the first symbol of a control channel resource set and the last symbol of a time domain resource used to send the random access preamble is greater than a first time-domain length threshold.

The second preset condition is that a time-domain interval between the first symbol of a control channel resource set and the last symbol of a time domain resource used to send the uplink data is greater than a second time-domain length threshold.

In a design of the first aspect, the method further includes:

The user equipment receives configuration information of a second-type random access procedure from the network device, where the configuration information of the second-type random access procedure includes length configuration information of a random access response window and/or length configuration information of a first contention resolution window.

A length of the first time window is the same as a length of the random access response window.

Alternatively, a length of the first time window is the same as a length of the first contention resolution window.

Alternatively, a length of the first time window is a sum of a length of the random access response window and a length of the first contention resolution window.

Alternatively, a length of the first time window is a maximum value in a length of the random access response window and a length of the first contention resolution window.

Alternatively, a length of the first time window is a sum of a length of the random access window and a window length increment configured by the network device.

In a design of the first aspect, if a time-frequency resource used to send the random access preamble is also used to send a random access message of a second-type random access procedure, the user equipment starts the first time window at the first symbol of the first control channel resource set.

In a design of the first aspect, if the time-frequency resource used to send the random access preamble is also used to send a random access message of the second-type random access procedure, the length of the first time window is the same as the length of the random access response window or the length of the first contention resolution window.

In a design of the first aspect, the method includes:
If the first DCI is detected within the first time window and the first response message includes information used to indicate to retransmit the uplink data, the user equipment terminates the first time window, and retransmits the uplink data.

After the retransmission of the uplink data ends, the user equipment starts a second contention resolution window.

In a design of the first aspect, the method further includes:
If third DCI that is used to schedule a PDSCH carrying contention resolution information is detected within a second contention resolution window and it is determined, based on the contention resolution information, that contention resolution succeeds, the user equipment terminates the contention resolution window; and/or
if fourth DCI that is used to schedule retransmission of the uplink data is detected within the second contention resolution window, the user equipment retransmits the uplink data based on the fourth DCI, and restarts the second contention resolution window after the retransmission of the uplink data ends.

In a design of the first aspect, the method further includes:
If the first DCI is detected within the first time window and the first response message includes information used to indicate to resend the random access message of the first-type random access procedure, the user equipment resends a second random access message of the first-type random access procedure, and restarts the first time window. The second random access message carries all or a part of the uplink data.

In a design of the first aspect, the method further includes:
If the first DCI is detected within the first time window and the first response message includes information used to indicate to roll back from the first-type random access procedure to the second-type random access procedure, the user equipment terminates the first time window, and switches to performing the second-type random access procedure.

User equipment receives a first control channel resource set used to monitor a common physical downlink control channel (PDCCH) and a second control channel resource set used to monitor a specific PDCCH that are sent by a network device. The first control channel resource set is corresponding to a first search space, and the second control channel resource set is corresponding to a second search space.

The user equipment sends a first message to the network device. The first message includes a random access preamble and a physical uplink shared channel (PUSCH).

The user equipment monitors the first search space and the second search space to receive at least one of the common PDCCH and the specific PDCCH that are sent by the network device. The at least one of the common PDCCH and the specific PDCCH is used to schedule a PDSCH for carrying a response message of the first message, and the response message includes at least one of a response to the random access preamble and a response to the PUSCH. The response to the random access preamble is carried on a PDSCH scheduled by the common PDCCH, and the response to the PUSCH is carried on a specific PDSCH scheduled by the specific PDCCH.

Therefore, in some embodiments of this application, the user equipment monitors the first search space and the second search space to receive the at least one of the common PDCCH and the specific PDCCH. The at least one of the common PDCCH and the specific PDCCH is used to schedule the PDSCH for carrying the response message of the first message, the first message includes the preamble and the PUSCH, and the response message includes the at least one of the response to the preamble and the response to the PUSCH. In comparison with a conventional technology in which a PDSCH for carrying a MsgB is scheduled by one common PDCCH, in some embodiments of this application, transmission efficiency of the response message can be improved based on scheduling of the response message through a plurality of PDCCHs.

In some embodiments of this application, the first control channel resource set may be the same as or different from the second control channel resource set, and the first search space may be the same as or different from the second search space. In an optional embodiment of this application, the first search space may be corresponding to a common search space, and the second search space may be corresponding to a specific search space. In another optional embodiment of this application, the second search space and the first search space may be the same, and both are common search spaces.

With reference to the first aspect, in some implementations of the first aspect, that the user equipment monitors the first search space and the second search space to receive at least one of the common PDCCH and the specific PDCCH that are sent by the network device includes:
The user equipment monitors the second search space to receive the specific PDCCH. The specific PDCCH is used to schedule the PDSCH for carrying the response message of the first message, and the response message includes the response to the PUSCH.

Alternatively, the user equipment monitors the first search space to receive the common PDCCH. The common PDCCH is used to schedule the PDSCH for carrying the response message of the first message, and the response message includes the response to the random access preamble.

Therefore, in some embodiments of this application, the network device can adaptively adjust a transmission mode of the response message (namely, a MsgB) based on a detection status of the first message (namely, a MsgA). A specific PDCCH is used to indicate a specific PDSCH, so that efficient transmission of different MsgB is supported. In addition, a common PDCCH is used to indicate a common PDSCH, so that response transmission is supported when some MsgA are correctly detected. Therefore, in some embodiments of this application, flexible and efficient MsgB response transmission can be implemented.

With reference to the first aspect, in some implementations of the first aspect, that the user equipment monitors the first search space and the second search space to receive at least one of the common PDCCH and the specific PDCCH that are sent by the network device includes:

The user equipment monitors the first search space to receive the common PDCCH. The common PDCCH is used to schedule the response to the random access preamble.

The user equipment monitors the second search space based on the response to the random access preamble, to receive the specific PDCCH. The specific PDCCH is used to schedule the PDSCH for carrying the response to the PUSCH.

Therefore, in some embodiments of this application, the network device can adaptively adjust a transmission mode of a MsgB based on a detection status of a MsgA. A specific PDCCH is used to indicate a specific PDSCH, so that efficient transmission of different MsgB is supported. In addition, a common PDCCH is used to indicate a common PDSCH, so that response transmission is supported when some MsgA are correctly detected. Therefore, flexible and efficient MsgB response transmission can be implemented.

Optionally, in an embodiment of this application, if the user equipment does not accurately detect, based on the common PDCCH and the common PDSCH, the response corresponding to the preamble in the sent MsgA, the user equipment does not need to monitor the specific PDCCH. Therefore, complexity and power consumption of a terminal can be further reduced.

With reference to the first aspect, in some implementations of the first aspect, that the user equipment monitors the second search space to receive the specific PDCCH includes:

The user equipment monitors the second search space based on a specific radio network temporary identifier (specific radio network temporary identifier, S-RNTI), to receive the specific PDCCH. The S-RNTI is determined based on a resource element used to send the first message, the S-RNTI is a cell radio network temporary identifier (cell radio network temporary identifier, C-RNTI), or the S-RNTI is determined based on a contention conflict resolution identifier in the first message.

The resource element used to send the first message includes at least one of an index of the random access preamble, a time-frequency resource block of the PUSCH, and an antenna port corresponding to the PUSCH.

Therefore, a plurality of user equipments use different resource elements to send different first messages. Therefore, the plurality of user equipments may be corresponding to different S-RNTIs. In this case, on a specific PUSCH scheduled by a specific PDCCH corresponding to each user equipment, the network device can include a response of the user equipment to the PUSCH.

With reference to the first aspect, in some implementations of the first aspect, that the terminal monitors the second search space based on the response to the random access preamble, to receive the specific PDCCH includes:

The user equipment monitors the second search space based on a temporary cell radio network temporary identifier (TC-RNTI) carried in the response to the random access preamble, to receive the specific PDCCH.

Therefore, in some embodiments of this application, the user equipment may first detect the common PDCCH, and then determine, based on a detection status of the common PDCCH, whether to detect the specific PDCCH. To be specific, if successfully detecting the common PDCCH, the user equipment obtains the TC-RNTI from the common PDSCH scheduled by the common PDCCH, and then may continue to monitor the specific PDCCH based on the TC-RNTI. If failing to detect the common PDCCH, the user equipment cannot obtain the TC-RNTI. Therefore, the user equipment may no longer continue to monitor the specific PDCCH.

With reference to the first aspect, in some implementations of the first aspect, that the user equipment monitors the first search space to receive the common PDCCH includes:

The user equipment monitors the first search space based on a group radio network temporary identifier (G-RNTI), to receive the common PDCCH. The G-RNTI is determined based on a resource block in which a resource element used to send the first message is located, and the resource block includes a time-frequency resource block used to send the random access preamble.

Therefore, resource elements used by the plurality of user equipments to send different first messages may be located in a same resource block. Therefore, the plurality of user equipments may be corresponding to a same &-RNTI. In this case, in the PUSCH scheduled by the common PDCCH, the network device can include all responses of the plurality of user equipments to the random access preamble.

With reference to the first aspect, in some implementations of the first aspect, the method further includes:

The user equipment obtains first configuration information. The first configuration information includes a window length of the first time window and a window length of a second time window. The window length of the first time window is a length of a time window used to receive the response message of the first message, the window length of the second time window is a length of a time window used to receive a response message of a second message, and the second message includes only the random access preamble.

Therefore, for user equipment that supports both a 4-step RACH and a 2-step RACH, the network device may flexibly indicate a start position of a time window for receiving the response message, to meet requirements on processing latency of receiving a response by the user equipment and a capacity of a control channel in two different scenarios, namely, the 4-step RACH and the 2-step RACH.

With reference to the first aspect, in some implementations of the first aspect, the first time window starts after a time-domain symbol occupied by the PUSCH. Therefore, for a 2-step RACH procedure, the user equipment may enter a receiving phase of the MsgB after sending the PUSCH.

With reference to the first aspect, in some implementations of the first aspect, the time-domain symbol occupied by the PUSCH may include a null symbol, and the null symbol is a part of the PUSCH and is not used to send any signal. Specifically, the null symbol may be used as a guard interval (guard time). Therefore, in some embodiments of this application, the network device determines, based on a guard interval of PUSCH transmission, the start position of the time window for receiving the response message, to further reduce power consumption of the user equipment.

With reference to the first aspect, in some implementations of the first aspect, the method further includes:

The user equipment obtains second configuration information. The second configuration information includes a window length of a third time window and a window length of a fourth time window. The window length of the third time window is a length of a time window used to receive the RAR, and the window length of the fourth time window is a length of the time window used to receive the response to the PUSCH.

Therefore, when the MsgB includes a first part that is of the response to the preamble in the MsgA and that is sent through a common PDCCH and a common PDSCH corresponding to the common PDCCH, and includes a second part that is of the response to the PUSCH in the MsgA and that is sent through a specific PDCCH and a specific PDSCH corresponding to the specific PDCCH, the network device may flexibly indicate start positions of time windows respectively for receiving the response information corresponding to the two parts of response content, to meet requirements on processing latency of receiving the response by the user equipment and a capacity of a control channel.

With reference to the first aspect, in some implementations of the first aspect, the third time window starts from a time-domain symbol after a time-domain symbol of the random access preamble preamble. In this case, after sending the preamble, the user equipment may enter a receiving phase of the response to the preamble, and monitor the common PDCCH in the first search space.

With reference to the first aspect, in some implementations of the first aspect, the fourth time window starts after a common PDSCH received by the user equipment, and the common PDSCH is scheduled by the common PDCCH. In this way, after detecting the common PDCCH and receiving the common PDSCH scheduled by the common PDCCH, the user equipment may enter a receiving phase of a response to the PUSCH, and monitor the specific PDCCH in the second search space.

Optionally, in an embodiment of this application, the network device may further determine, based on processing latency of the PUSCH and/or common PDSCH, a start position of a time window for receiving the response message, to further reduce power consumption of the user equipment.

With reference to the first aspect, in some implementations of the first aspect, the second search space is determined based on an S-RNTI for scrambling the specific PDCCH. Therefore, in this embodiment of this application, for the user equipment that monitors the second search space, when the user equipment does not obtain the TC-RNTI, the user equipment may determine a start position of the second search space based on the S-RNTI.

According to a second aspect, a random access method is provided, including:

User equipment sends a random access message of a first-type random access procedure to a network device. The random access message of the first-type random access procedure includes a random access preamble and uplink data.

The user equipment starts a second time window after transmission of the random access preamble ends, and detects first downlink control information (DCI) within the first time window. The first DCI is used to schedule a first physical downlink shared channel (PDSCH) for carrying a first response message for the random access preamble.

The user equipment starts a third time window after transmission of the uplink data ends, and detects second DCI within the third time window. The second DCI is used to schedule a second PDSCH for carrying a second response message for the uplink data.

In a design of the second aspect, the user equipment starts the second time window at the first symbol of a first control channel resource set:
the user equipment starts the second time window at the first symbol of a second control channel resource set; or
the user equipment starts the second time window at a start position of the third time window.

The first control channel resource set is a control channel resource set after the transmission of the random access preamble ends, and the second control channel resource set is a control channel resource set after the transmission of the uplink data ends.

In a design of the second aspect, the first control channel resource set is a control channel resource set that first meets a first preset condition after the transmission of the random access preamble ends; and/or
the second control channel resource set is a control channel resource set that first meets a second preset condition after the transmission of the uplink data ends.

The first preset condition is that a time-domain interval between the first symbol of a control channel resource set and the last symbol of a time domain resource used to send the random access preamble is greater than a first time-domain length threshold.

The second preset condition is that a time-domain interval between the first symbol of a control channel resource set and the last symbol of a time domain resource used to send the uplink data is greater than a second time-domain length threshold.

In a design of the second aspect, the method further includes:
The user equipment receives length configuration information of a random access response window of a second-type random access procedure from the network device.
A length of the second time window is the same as a length of the random access response window.
Alternatively, a length of the second time window is a sum of a length of the random access response window and a window length increment configured by the network device.

In a design of the second aspect, the method further includes:
The user equipment receives length configuration information of a contention resolution window of the second-type random access procedure from the network device.
A length of the third time window is the same as a length of the random access response window.
Alternatively, a length of the third time window is a sum of a length of the random access response window and a window length increment configured by the network device.

In a design of the second aspect, the length of the third time window is the same as the length of the second time window.

In a design of the second aspect, if a time-frequency resource used to send the random access preamble is also used to send a random access message of the second-type random access procedure, the user equipment starts the second time window at the first symbol of the first control channel resource set.

In a design of the second aspect, the method includes:
If detecting the second DCI and determining, based on the second response message, that contention resolution succeeds, the user equipment terminates the third time window, and terminates the first time window if the first time window is not terminated when the third time window is terminated.

In a design of the second aspect, the method includes:
If the first DCI is detected within the second time window and the first response message includes indication information indicating to retransmit the uplink data, the user equipment stops the second time window, retransmits the uplink data based on an uplink grant in the first response message, and restarts the third time window.

In a design of the second aspect, the method includes:

The user equipment detects third DCI within the restarted third time window. The third DCI is used to schedule a third PDSCH for carrying a third response message for retransmission of the uplink data.

If detecting the third DCI, the user equipment receives the third PDSCH based on the third DCI, and obtains the third response message.

If determining, based on the third response message, that the contention resolution succeeds, the user equipment terminates the restarted third time window.

In a design of the second aspect, the method includes:

If detecting fourth DCI within the restarted third time window, and the fourth DCI is used to schedule retransmission of the uplink data, the user equipment retransmits the uplink data based on the fourth DCI, and restarts the third time window.

In a design of the second aspect, the method further includes:

If the first DCI is detected within the second time window and the first response message includes information used to indicate to resend the random access message of the first-type random access procedure, the user equipment resends a second random access message of the first-type random access procedure, and restarts the second time window and the third time window. The second random access message carries all or a part of the uplink data.

In a design of the second aspect, the method further includes:

If the first DCI is detected within the second time window and the first response message includes information used to indicate to roll back from the first-type random access procedure to the second-type random access procedure, the user equipment terminates the second time window and the third time window, and switches to performing the second-type random access procedure.

According to a third aspect, a communications apparatus is provided. The apparatus may be a terminal device or a chip in user equipment. The apparatus has a function of implementing any one of the first aspect, the second aspect, or various possible implementations thereof. The function may be implemented by hardware, or may be implemented by hardware executing corresponding software. The hardware or the software includes one or more modules corresponding to the function.

In a possible design, the apparatus includes a transceiver module. Optionally, the apparatus further includes a processing module. The transceiver module may be, for example, at least one of a transceiver, a receiver, or a transmitter. The transceiver module may include a radio frequency circuit or an antenna. The processing module may be a processor. Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module, to enable the apparatus to perform the method according to any one of the first aspect and various possible implementations thereof.

In another possible design, when the apparatus is a chip, the chip includes a transceiver module. Optionally, the chip further includes a processing module. The transceiver module may be, for example, an input/output interface, a pin, or a circuit on the chip. The processing module may be, for example, a processor. The processing module may execute instructions, to enable the chip in the terminal to perform the communication method according to any one of the first aspect and the possible implementations thereof. Optionally, the processing module may execute instructions in a storage module, and the storage module may be a storage module in the chip, for example, a register or a buffer. The storage module may alternatively be located inside a communications device but outside the chip, for example, a read-only memory (ROM), another type of static storage device that can store static information and instructions, or a random access memory (RAM).

The processor mentioned in any of the foregoing designs may be a general-purpose central processing unit (CPU), a microprocessor, an application-specific integrated circuit (application-specific integrated circuit, ASIC), or one or more integrated circuits configured to control program execution of the method according to any one of the first aspect and the possible implementations thereof.

According to a fourth aspect, a computer storage medium is provided. The computer storage medium stores program code. The program code is used to indicate an instruction for performing the method according to any one of the first aspect, the second aspect, or the possible implementations thereof.

According to a fifth aspect, a computer program product including instructions is provided. When the computer program product is run on a communications apparatus, the communications apparatus is enabled to perform the method according to any one of the first aspect, the second aspect, or the possible implementations thereof.

According to a sixth aspect, a communications system is provided. The communications system includes an apparatus and a network device that have functions of implementing the method according to any one of the first aspect, the second aspect, and various possible designs thereof.

According to a seventh aspect, a processor is provided. The processor is coupled to a memory, and is configured to perform the method according to any one of the first aspect, the second aspect, or the possible implementations thereof.

According to an eighth aspect, a chip is provided. The chip includes a processor and a communications interface. The communications interface is configured to communicate with an external component or an internal component, and the processor is configured to implement the method according to any one of the first aspect, the second aspect, or the possible implementations thereof.

Optionally, the chip may further include a memory. The memory stores instructions. The processor is configured to execute the instructions stored in the memory or instructions from another module. When the instructions are executed, the processor is configured to implement the method according to any one of the first aspect, the second aspect, or the possible implementations thereof.

Optionally, the chip may be integrated into a terminal device.

DESCRIPTION OF EMBODIMENTS

Figure 1:
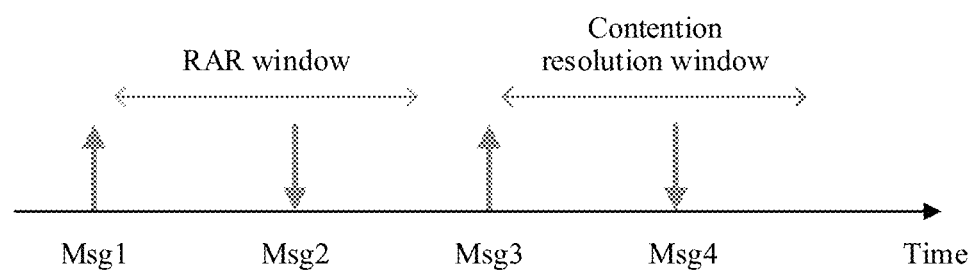
FIG. 1 is a schematic diagram of a time sequence of a 4-step random access procedure.

The following describes technical solutions of this application with reference to the accompanying drawings.

In this application, the first, second, third, and various numbers are merely used for differentiation for convenient description, and are not intended to limit the scope of embodiments of this application, for example, used to distinguish between different messages, different search spaces, different configuration information, and different time windows.

It should be further understood that, in the embodiments shown below, "pre-obtaining" may include being indicated by using network device signaling or predefined, for example, defined in a protocol. The "predefinition" may be implemented in a manner in which corresponding code, a table, or other related indication information may be pre-stored in a device (for example, including a terminal device and a network device). A specific implementation of the "predefinition" is not limited in this application.

It should be further understood that "store" in the embodiments of this application may mean that the code, the table, or the information is stored in one or more memories. The one or more memories may be separately disposed, or may be integrated into an encoder, a decoder, a processor, or a communications apparatus. Alternatively, some of the one or more memories may be separately disposed, and some of the one or more memories are integrated into a decoder, a processor, or a communications apparatus. A type of the memory may be any form of storage medium. This is not limited in this application.

It should be further understood that, "protocol" in the embodiments of this application may be a standard protocol in the communications field, for example, may include an LTE protocol, an NR protocol, and a related protocol applied to a future communications system. This is not limited in this application.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a relative concept in a specific manner.

The technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, or a future 5th generation (5G) system or new radio (NR) system.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems. The embodiments of this application are described by using an example in which a provided method is applied to a new radio (NR) system or a 5G network.

Figure 2:
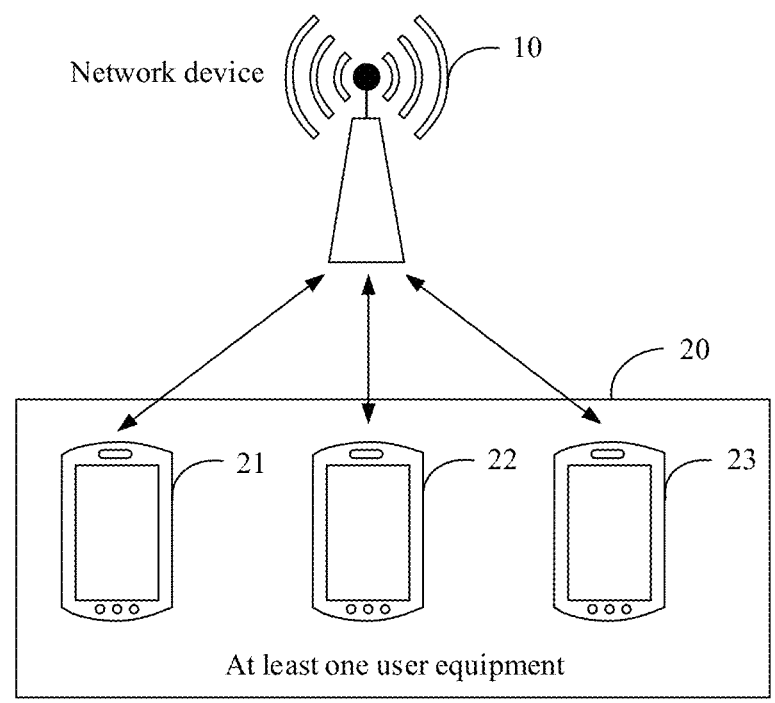
FIG. 2 is a schematic structural diagram of a communications system according to an embodiment of this application.

FIG. 2 is a schematic structural diagram of a communications system according to an embodiment of this application. Referring to FIG. 2, the communications system includes a network device 10, and at least one user equipment (user equipment, UE) 20. The network device 10 may communicate with the at least one user equipment 20. In FIG. 2, an example in which the at least one user equipment 20 includes user equipment 21, user equipment 22, and user equipment 23 is used for description.

The network device 10 may be a device configured to communicate with a terminal device. The network device may be an evolved NodeB (evolved NodeB, eNB or eNodeB) in an LTE system, or may be a radio controller in a cloud radio access network (CRAN) scenario. Alternatively, the network device may be a relay station, an access point, a vehicle-mounted device, a wearable device, a network device (for example, a base station) in a 5G network, a network device in a future evolved PLMN network, or the like. This is not limited in the embodiments of this application.

The at least one user equipment 20 may be a device that has a wireless communication function, and may be deployed on land, including an indoor or outdoor device, a handheld device, or a vehicle-mounted device; or may be deployed on water (for example, on a ship); or may be deployed in air (for example, on an aircraft, a balloon, and a satellite). The user equipment may also be referred to as a mobile station (MS), a terminal, a mobile terminal (MT), a terminal device, or the like, and is a device that provides voice and/or data connectivity for a user. For example, the user equipment includes a handheld device, a vehicle-mounted device, or the like that has a wireless connection function. Currently, the user equipment may be a mobile phone, a tablet, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, wireless user equipment in industrial control, a smart home device (for example, a refrigerator, a television, an air conditioner, or an electricity meter), an intelligent robot, a workshop device, wireless user equipment in self-driving, wireless user equipment in remote medical surgery, wireless user equipment in a smart grid, wireless user equipment in transportation safety, wireless user equipment in a smart city, wireless user equipment in a smart home (smart home), a flight device (for example, an intelligent robot, a hot balloon, an unmanned aerial vehicle, or an aircraft), or the like. In a possible application scenario of this application, the user equipment is user equipment that often operates on land, for example, a vehicle-mounted device. In this application, for ease of description, a chip deployed in the foregoing device, for example, a system-on-a-chip (SOC), a baseband chip, or another chip having a communication function, may also be referred to as user equipment.

For example, in some embodiments of this application, the at least one user equipment 20 may further include a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In a communications system such as LTE, 5G, or NR, user equipment needs to enter a radio resource control (RRC) connected mode from an RRC idle (idle) mode or inactive (inactive) mode by performing a random access procedure (RA procedure). Then, the user equipment can establish various bearers with a network device, obtain corresponding resources, parameter configurations, and the like, and then communicate with the network device based on obtained resources and parameters. The random access procedure may include a four-step random access procedure (4-step RA procedure) and a two-step random access procedure (2-step RA procedure). The following separately describes the four-step random access procedure and the two-step random access procedure by using FIG. 3 and FIG. 4.

Figure 3:
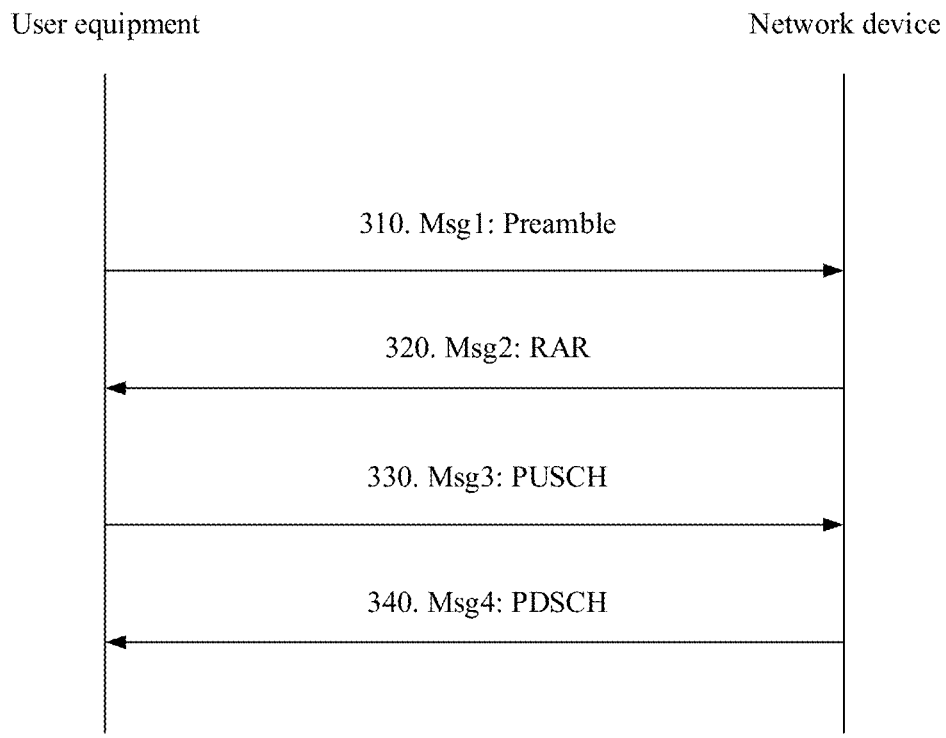
FIG. 3 is a schematic flowchart of an existing 4-step random access procedure.

FIG. 3 is a schematic flowchart of a 4-step RA procedure. A solution of the 4-step RA procedure includes 310 to 340.

310: A terminal device sends a message 1 (a Msg1), where the Msg1 includes a random access preamble (preamble for short).

320: The terminal device receives a Msg2 sent by a network device, where the Msg2 includes a response to the preamble, the response is usually referred to as a random access response (RAR), and the RAR is carried on a PDSCH scheduled by a PDCCH scrambled by a random access radio network temporary identifier (RA-RATI).

330: The terminal device sends a PUSCH, namely, a Msg3, based on an uplink grant (UL grant) in the RAR, to carry information such as user identifier information used for contention conflict resolution and/or an RRC connection request.

Optionally, to support early data transmission (EDT), the terminal device may include user side data information in the PUSCH of the Msg3.

340: The terminal device receives a PDSCH, namely, a Msg4, sent by the network device, where the PDSCH is scheduled by a PDCCH scrambled by a TC-RNTI, the PDSCH includes feedback information for the Msg3, and the feedback information includes information sent by the terminal device, for example, the user identifier information and RRC connection setup.

It can be learned from FIG. 3 that, to complete the 4-step RA procedure, four steps of the Msg1, the Msg2, the Msg3, and the Msg4 need to be implemented. Considering a waiting interval of data processing, it takes about dozens of milliseconds to complete a 4-step RA procedure. This cannot meet a requirement of a new low-latency service. Therefore, a 2-step RA procedure is introduced.

Figure 4:
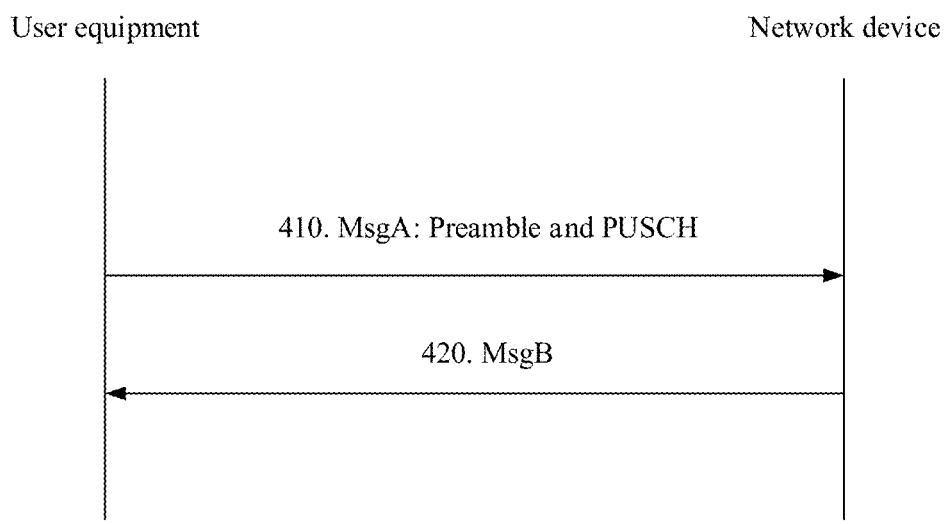
FIG. 4 is a schematic flowchart of an existing 2-step RACH.

FIG. 4 is a schematic flowchart of a 2-step RA procedure. A solution of the 2-step RA procedure includes step 410 and step 420.

410: A terminal device sends a message A (a MsgA), where the MsgA includes a random access preamble preamble and a PUSCH.

420: The terminal device receives a response message B (a MsgB) that is for the MsgA and that is sent by the network device.

In an embodiment of this application, the MsgB includes at least one of a response to the preamble and a response to the PUSCH, and the response to the random access preamble (preamble) in the MsgB may also be referred to as a random access response RAR. Herein, the RAR may include at least one of a timing advance (TA), a temporary cell radio network temporary identifier (temporary C-RNTI. TC-RNTI), an uplink grant (UL grant), and a preamble index. The response to the PUSCH is, for example, contention resolution information (CRM), and mainly includes at least one of identification information of the terminal device, RRC connection (re-)setup (connection (re-)setup) information, and the like.

It can be learned from the foregoing descriptions that the MsgA in the 2-step RA procedure is different from the Msg1 and the Msg3 in the 4-step RA procedure, and a method for obtaining the Msg2 or Msg4 in the existing 4-step RA procedure (for example, a method for obtaining the time windows of the foregoing two types of messages shown in FIG. 1) is not applicable to the solution of the 2-step RA procedure. Therefore, for the 2-step RA procedure, a solution for obtaining the MsgB is urgently required.

An embodiment of this application provides a method of obtaining responses to different parts of the MsgA in a 2-step RACH procedure by maintaining one or two time windows. The following describes the embodiments of this application in detail with reference to the accompanying drawings.

In an embodiment of this application, a first-type random access procedure means a two-step random access procedure, and a second-type random access procedure means a four-step random access procedure. A random access message mentioned in the embodiments of this application means a random access request in a random access procedure, namely, the first message initiated by the user equipment to the network device in the random access procedure, for example, the MsgA in the 2-step RA procedure or the Msg1 in the 4-step RA Procedure. A feature of the MsgA is that the MsgA includes not only a random access preamble but also uplink data. A feature of the Msg1 is that the Msg1 includes only a random access preamble or includes a random access preamble but does not include uplink data. In some embodiments, provided that the random access request includes both a preamble and uplink data (a PUSCH), a random access procedure corresponding to the random access request belongs to a first-type random access procedure; provided that the random access request includes a preamble but does not include uplink data, a random access procedure corresponding to the random access request belongs to a second-type random access procedure.

Figure 5:
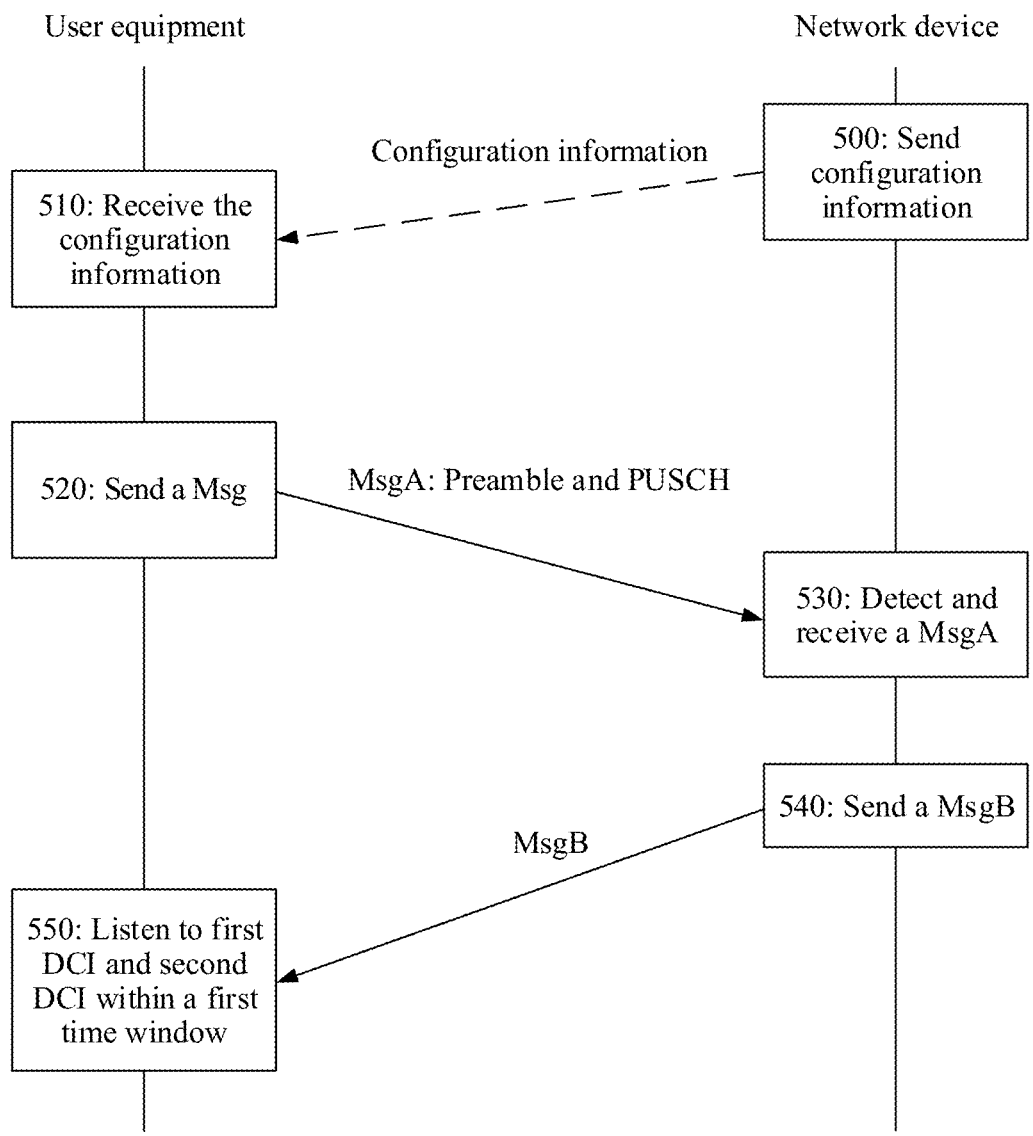
FIG. 5 is a schematic flowchart of a random access method according to an embodiment of this application.

FIG. 5 is a schematic flowchart of a random access method shown from a perspective of device interaction. As shown in FIG. 5, the method may include step 500 to step 550.

Step 500: A network device sends configuration information of a two-step random access procedure, where the configuration information includes configuration information of a physical random access channel (PRACH) time-frequency resource and configuration information of a PUSCH time-frequency resource.

The PRACH time-frequency resource is also referred to as a PRACH occasion (RO), and is a time-frequency resource element used to send a random access preamble.

Figure 14:
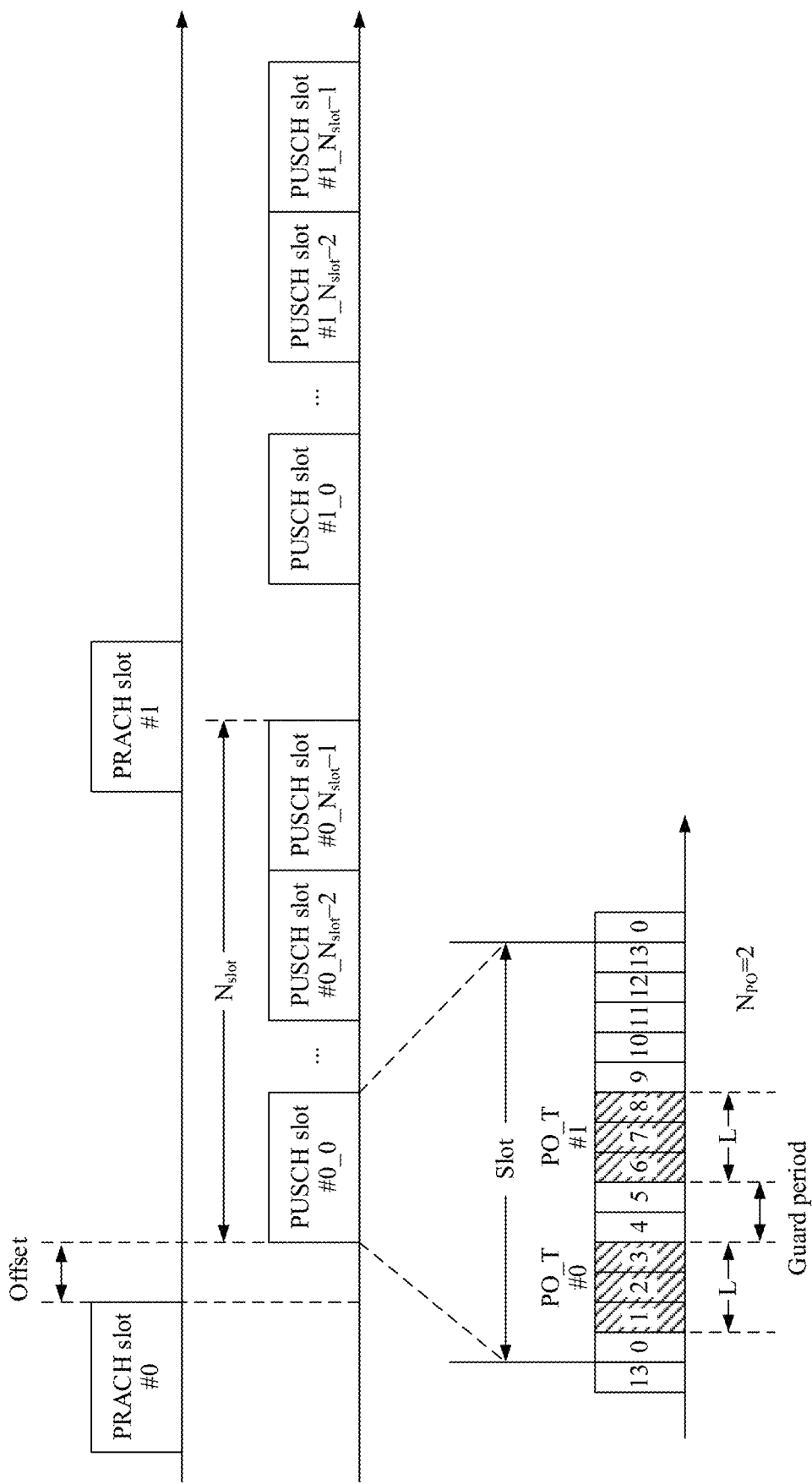
FIG. 14 is a schematic diagram of a time-frequency resource of a PUSCH according to an embodiment of this application.

The network device may send the configuration information of the two-step random access procedure to the user equipment by using a broadcast or multicast message, an RRC message, or the like. The network device may send the configuration information of the PRACH time-frequency resource and the configuration information of the PUSCH time-frequency resource separately or together to the user equipment. The configuration information of the PRACH time-frequency resource indicates one or more PRACH time-frequency resources. The configuration information of the PUSCH time-frequency resource indicates one or more PUSCH time-frequency resources. A time-frequency resource used to transmit uplink data in a MsgA is referred to as a PUSCH time-frequency resource, and may also be referred to as a PUSCH occasion (PUSCH Occasion, PO). In a specific example, the configuration information of the PUSCH time-frequency resource includes configuration information of a PUSCH time-domain offset, configuration information of a start symbol and time-domain length of the PUSCH occasion, configuration information of a PUSCH time-domain guard interval, configuration information of a quantity of slots including the PUSCH time-frequency resources, and configuration information of a quantity of PUSCH occasion time domain resources in one slot. The configuration information of the PUSCH time-domain offset is used to configure a time-domain offset offset of the first slot including the PUSCH occasion relative to a start position of each PRACH slot. The configuration information of the PUSCH time-domain guard interval is used to determine a time-domain interval guard period between PUSCH occasions in a slot. The configuration information of the quantity of slots including the PUSCH time-frequency resources is used to configure a quantity $N_{slots}$ of consecutive slots including the PUSCH occasion. The configuration information of the quantity of PUSCH occasion time domain resources in one slot is used to configure a quantity $N_{PO}$ of PUSCH occasion time domain resources in each slot. A PUSCH occasion time domain resource is a resource of one PUSCH occasion in a time-domain dimension. If there are a plurality of PUSCH occasions in one slot, and time domain resources (including start positions and lengths) of the PUSCH occasions are the same, but frequency domain resources of the PUSCH occasions are different, there is only one PUSCH occasion time domain resource in the slot. As shown in FIG. 14, the quantity $N_{PO}$ of PUSCH occasion time domain resources in one PUSCH slot is 2. For example, two PUSCH occasion time domain resources in a PUSCH slot #0_1 are respectively PO_T #0 and PO_T #1. The configuration information of the start symbol and time-domain length of the PUSCH occasion is used to indicate a time-domain start position S and a length L of the first PUSCH occasion in each slot. FIG. 14 shows a specific example of a PUSCH occasion configured by using the configuration information of the PUSCH time-frequency resource. It may be understood that the configuration information of the PUSCH time-frequency resource may further include configuration information of a frequency domain resource of each PUSCH occasion.

It should be noted that, in addition to the configuration information of the PRACH time-frequency resource and the configuration information of the PUSCH time-frequency resource, the configuration information of the two-step random access procedure may further include other configuration information (for example, configuration information of the preamble). This is not limited in this embodiment of this application.

Step 510: The user equipment receives the configuration information of the two-step random access procedure from the network device.

Step 520: The user equipment sends a MsgA, where the MsgA includes a preamble and uplink data, the preamble is carried on a PRACH, and the uplink data is carried on a PUSCH.

The user equipment determines, based on the received configuration information of the two-step random access procedure, a PRACH time-frequency resource used to send the preamble in the MsgA and a PUSCH time-frequency resource used to send the uplink data in the MsgA. The user equipment sends the preamble on the determined PRACH time-frequency resource, and sends the uplink data on the determined PUSCH time-frequency resource.

Step 530: The network device detects and receives the MsgA.

In this step, the network device receives the preamble and the PUSCH on the configured PRACH time-frequency resource and PUSCH time-frequency resource respectively. Generally, the following three possible receiving cases exist:

(1) The network device does not receive or detect the preamble.
(2) The network device successfully detects the preamble, but fails to demodulate and decode the received PUSCH.
(3) The network device successfully detects the preamble, and successfully demodulates and decodes the received PUSCH.

In the case (1), because the preamble is not received or is not successfully detected, the network device does not send any response.

In the case (2), because the preamble is successfully detected but the received PUSCH fails to be demodulated and decoded, the network device generates a MsgB that includes only a response to the preamble. In an embodiment, the response to the preamble may be information that is generated because the preamble is successfully detected and that needs to be sent to the user equipment sending the preamble. The response to the preamble may be referred to as a RAR. The RAR and a RAR in an existing 4-step RA response may have same content, for example, include at least one of the following content: a TA, a TC-RNTI a UL grant, and a preamble index. In some embodiments, content in the RAR may be different from content in an existing 4-step RA response. In this application, the MsgB carrying only the response to the preamble may be referred to as a first response message.

In the case (3), the network device generates a MsgB, where the MsgB includes at least a response to the PUSCH. In an embodiment, the response to the PUSCH may be information that is generated because the PUSCH in the MsgA is successfully decoded and that is sent to the user equipment sending the PUSCH. The response to the PUSCH may include at least one of the following information: contention resolution information (contention resolution message. CRM) and RRC connection (re-)setup (connection (re-)setup) information.

In some embodiments, in the case (3), the network device may further generate, because the preamble is successfully detected, information that needs to be sent to the user equipment sending the preamble, that is, generate a response to the preamble. The response to the preamble may be referred to as a RAR, and the RAR may be the same as or different from the RAR generated in the case (2). This is not limited in this application. The RAR and the response to the PUSCH may be carried in a same MsgB, or may be carried in different messages.

In an embodiment, the MsgB carrying the response to the PUSCH is referred to as a second response message, or may be referred to as a response message for the MsgA. The MsgB, as the second response message, may have two possible implementations: The MsgB includes only the response to the PUSCH; the MsgB includes the response to the PUSCH and the response to the preamble.

Step 540: The network device sends the MsgB to the user equipment.

The network device sends a PDCCH and a PDSCH, where the PDCCH carries DCI used to schedule the PDSCH, and the PDSCH carries the MsgB. In an implementation, the network device sends a PDCCH carrying first DCI and a first PDSCH. The first DCI is used to schedule the first PDSCH, and the first PDSCH carries the MsgB (namely, the first response message) including only the response to the preamble (RAR). The network device sends a PDCCH carrying second DCI and a second PDSCH. The second DCI is used to schedule the second PDSCH, and the second PDSCH carries the MsgB (namely, the second response message) including the response to the PUSCH. For example, in the case (2), the network device sends the PDCCH carrying the first DCI and the first PDSCH; in the case (3), the network device sends the PDCCH carrying the second DCI and the second PDSCH.

After sending the MsgA, the user equipment needs to obtain the MsgB sent by the network device, to determine, based on content of the MsgB, whether random access succeeds. As described above, when the network device fails to detect the preamble sent by the user equipment, the network device does not send any message to the user equipment. Therefore, after sending the MsgA, the user equipment needs to detect, within a specific time range, whether the MsgB is received. If no MsgB is received within the time range, the user equipment may consider that currently initiated random access fails, and optionally, initiates new random access again.

Step 550: The user equipment detects the first DCI and the second DCI within a first time window.

After sending the MsgA, the user equipment starts a time window (which is referred to as a first time window). The user equipment detects the first DCI and the second DCI within the first time window. When the first time window ends, the user equipment stops detecting the first DCI and the second DCI.

This application provides the following plurality of implementations for starting the first time window.

Manner 1: After transmission of the preamble in the MsgA ends, the user equipment immediately starts the first time window.

Figure 6:
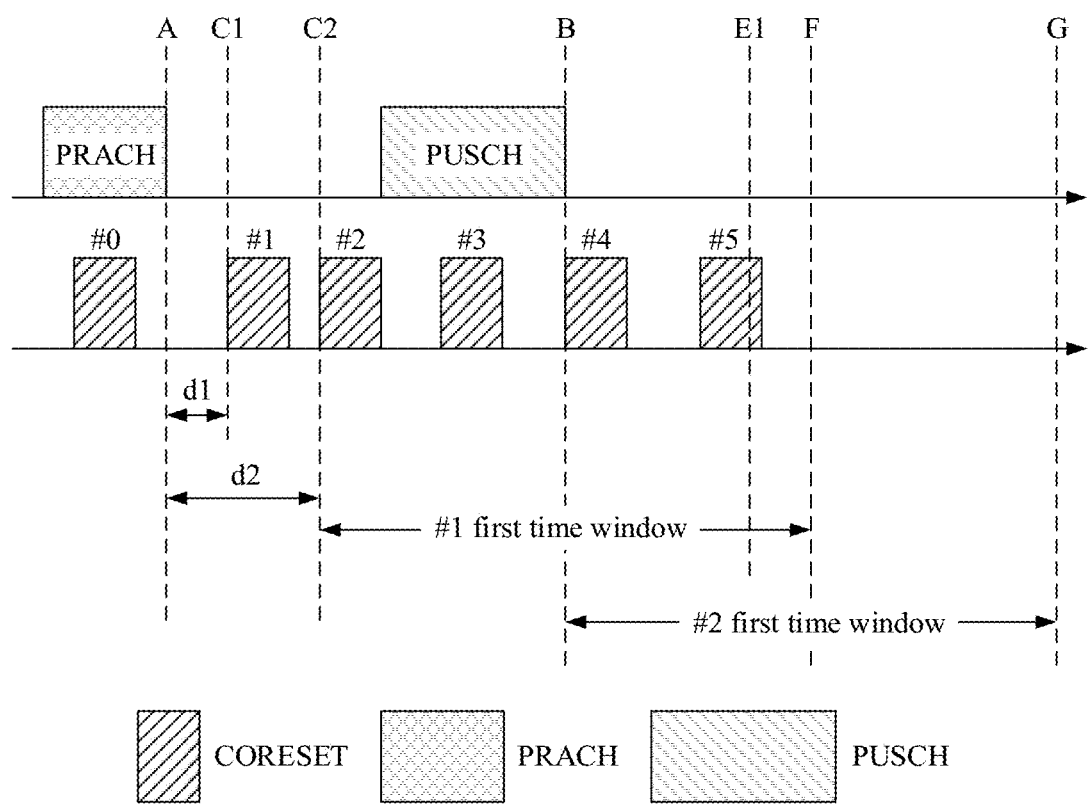
FIG. 6 is a schematic diagram of positions of time windows according to an embodiment of this application.

In this application, an end position of the transmission of the preamble in the MsgA is an end boundary of the last OFDM symbol of the PRACH, namely, a position A shown in FIG. 6. In this solution, the user equipment starts the first time window at the position A. In this application, starting the first time window at an XX position means that the first time window starts from the XX position.

Manner 2: The first time window is started at the first symbol of the first control resource set (CORESET) after transmission of the preamble in the MsgA ends.

The user equipment may detect, on the CORESET, to DCI sent by the network device. In an embodiment, as shown in FIG. 6, there may be a plurality of CORESETs (for example, a CORESET #0 to a CORESET #5) used by the user equipment to detect DCI. In the CORESET #0 to the CORESET #5, the first CORESET after the position A is the COREST #1. In an embodiment, the user equipment starts the first time window at the first OFDM symbol of the CORESET #1. That is, the first time window starts from the first OFDM symbol of the CORESET #1, namely, a position C in FIG. 6.

Manner 3: The first time window is started at the first OFDM symbol of a CORESET that first meets a first preset condition after transmission of the preamble in the MsgA ends. The first preset condition is that a time-domain interval between the first OFDM symbol of the CORESET and the last OFDM symbol of the PRACH time-frequency resource for sending the preamble is greater than or equal to a first threshold.

As shown in FIG. 6. CORESETs after the position A include the CORESET #1 to the CORESET #5. A time-domain interval between the first OFDM symbol of the CORESET #1 and the position A is d1, and a time-domain interval between the first OFDM symbol of the CORESET #2 and the position A is d2. Assuming that the first threshold is a value ranging from d1 to d2, a start position of the first time window determined according to the manner 3 is the first OFDM symbol of the CORESET #2. That is, the first time window is a "#1 first time window" in FIG. 6, and starts from a position C2.

Manner 4: The first time window is started at the first symbol of the first CORESET after transmission of the uplink data in the MsgA ends.

In this application, an end position of the transmission of the uplink data in the MsgA is an end boundary of the last OFDM symbol of the PUSCH, namely, a position B shown in FIG. 6.

As shown in FIG. 6, in the CORESET #0 to the CORESET #5, the first CORESET after the position B is the COREST #4. In an embodiment, the user equipment starts the first time window at the first OFDM symbol of the CORESET #4. That is, the first time window starts from the first OFDM symbol of the CORESET #4, namely, the position B in FIG. 6.

Manner 5: The first time window is started at the first OFDM symbol of a CORESET that first meets a preset condition after transmission of the uplink data in the MsgA ends. A second preset condition is that a time-domain interval between the first OFDM symbol of the CORESET and the last OFDM symbol of the PUSCH time-frequency resource for sending the uplink data is greater than or equal to a second threshold. The second threshold may be the same as or different from the first threshold. Similar to the first threshold, a value of the second threshold may be preset or configured by the network device.

As shown in FIG. 6, CORESETs after the position B include the CORESET #4 and the CORESET #5. A time-domain interval between the first OFDM symbol of the CORESET #4 and the position B is 0, and a time-domain interval between the first OFDM symbol of the CORESET #5 and the position B is d3. Assuming that the second threshold is a value between 0 and d3, a start position of the first time window determined according to the manner 5 is the first OFDM symbol of the CORESET #5.

Manner 6: A starting position of the first time window is determined based on whether the PRACH time-frequency resource used to send the preamble in step S520 is also used to send a preamble in a 4-step random access procedure.

Generally, the network device also sends configuration information of the 4-step RA procedure to the user equipment. The configuration information is used to configure parameters of the 4-step RA procedure, including: a PRACH time-frequency resource used to transmit the preamble, a window length of a RAR window (RAR window), and duration of a contention resolution timer. In this application, unless otherwise specified, the RAR window means a RAR window of the 4-step RA procedure, and the contention resolution timer means a contention resolution timer of the 4-step RA procedure. The duration of the contention resolution timer may also be understood as a window length of a contention resolution window, and the contention resolution timer is a specific implementation of the contention resolution window.

If a PRACH time-frequency resource configured by the network device for the 4-step RA procedure is the same as a PRACH time-frequency resource used for the 2-step RA procedure, the PRACH time-frequency resource is referred to as a shared PRACH time-frequency resource of the 4-step RA procedure and the 2-step RA procedure.

If the PRACH time-frequency resource for sending the preamble in step S520 is a shared PRACH time-frequency resource of the 4-step RA procedure and the 2-step RA procedure, in an implementation, the starting position of the first time window may be the same as a starting position of the RAR window of the 4-step RA procedure corresponding to the PRACH time-frequency resource. When the PRACH time-frequency resource is used for the 4-step RA procedure, the starting position of the RAR window is the first symbol of the first CORESET after the last OFDM symbol of the PRACH time-frequency resource. In addition, the first CORESET needs to meet the following condition: A time-domain interval between the first OFDM symbol of the CORESET and the last OFDM symbol of the PRACH time-frequency resource is greater than or equal to a preset threshold, and the CORESET is used to schedule a CORESET for carrying RAR transmission.

If the PRACH time-frequency resource used to send the preamble in step S520 is not a shared PRACH time-frequency resource of the 4-step RA procedure and the 2-step RA procedure, the starting position of the first time window may be the same as or different from a starting position of the RAR window of the 4-step RA procedure corresponding to the PRACH time-frequency resource.

Manner 7: The start position of the first time window is determined based on configuration information that is of the first time window and that is from the network device. In this manner, the configuration information that is of the two-step random access procedure and that is sent by the network device may include the configuration information of the first time window, and the configuration information of the first time window may be used to configure the start position of the first time window. In an embodiment, the start position that is of the first time window and configured by using the configuration information of the first time window may be the start position of the first time window in any one of other manners.

Manner 8: The first time window is started at the first OFDM symbol of a CORESET that first meets a third preset condition and that is after the last OFDM symbol of the first (or earliest) valid PUSCH occasion associated with the PRACH occasion. The third preset condition is that a time-domain interval between the first OFDM symbol of the CORESET and the last OFDM symbol of the first valid PUSCH occasion is greater than or equal to a third threshold. The third threshold is greater than or equal to 0, and may be the same as or different from the first threshold. In an embodiment, the PRACH occasion in the manner 8 is the PRACH occasion for sending the preamble in step S520.

Figure 12:
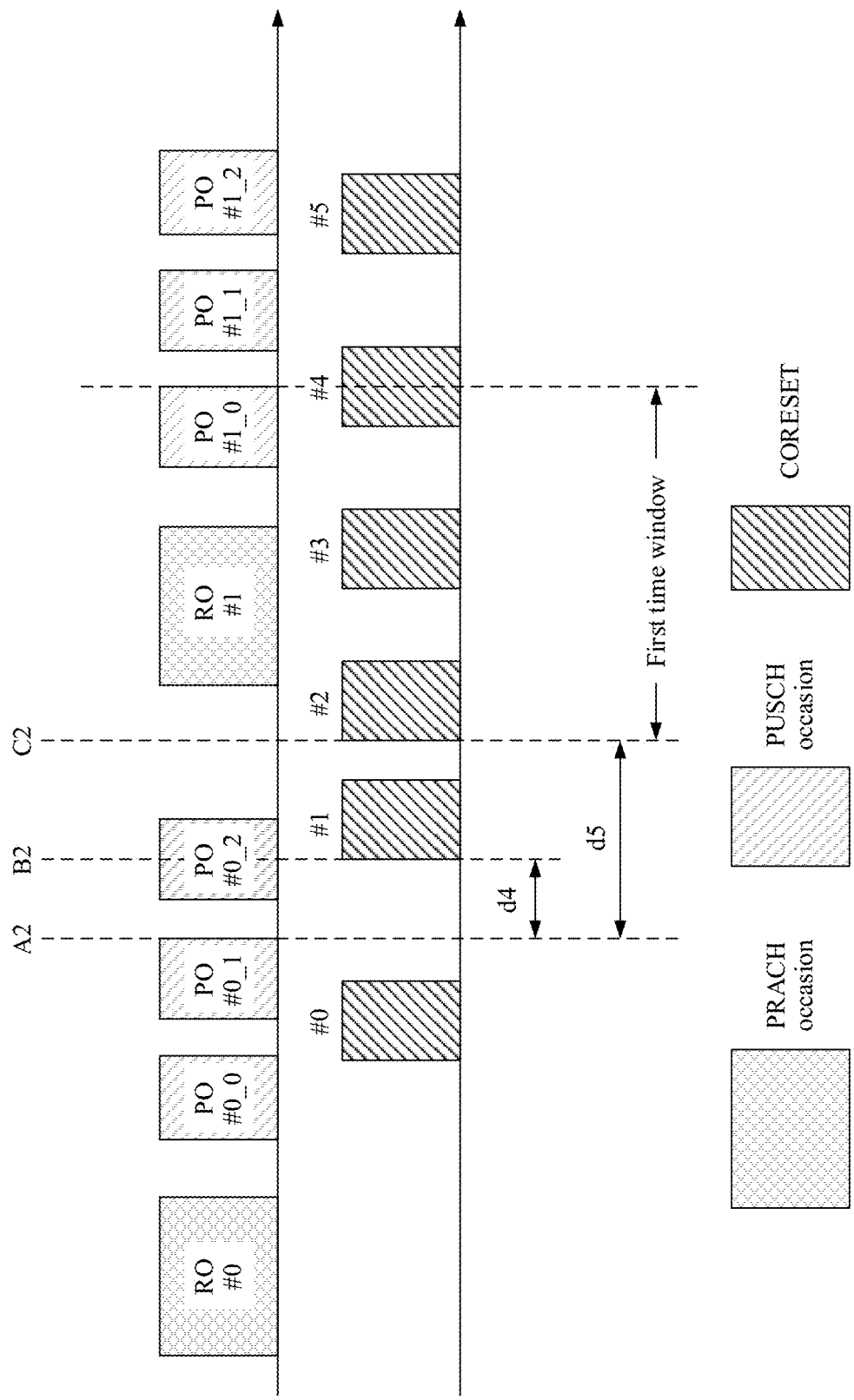
FIG. 12 is a schematic diagram of a position of another first time window according to an embodiment of this application.

In this application, a PRACH occasion and a PUSCH occasion used to respectively send two parts (a preamble and uplink data) of a same MsgA are considered to be associated with each other. In other words, after the PRACH occasion used to send the preamble of the MsgA is determined, only the PUSCH occasion associated with the PRACH occasion can be used to send the uplink data of the MsgA. As shown in FIG. 12, an RO #0 and an RO #1 are PRACH occasions that each can be used to send a MsgA, and a PO #0_0, a PO #0_1, and a PO #0_2 are PUSCH occasions that are associated with the RO #0 and determined based on configuration information of a PUSCH time-frequency resource, and a PO #1_0, a PO #1_1, and a PO #1_2 are PUSCH occasions that are associated with the RO #1 and determined based on configuration information of a PUSCH time-frequency resource. The RO #0 and one of the PO #0_0, the PO #0_1, and the PO #0_2 may be used to respectively send the preamble and uplink data of the same MsgA. The RO #1 and one of the PO #1_0, the PO #1_1, and the PO #1_2 may also be used to respectively send the preamble and uplink data of the same MsgA. In the foregoing POs determined based on the configuration information of the PUSCH time-frequency resource, only a PO that meets a preset condition can be used to send a PUSCH. A PO that can be used to send a PUSCH is a valid PO, and a PO that cannot be used to send a PUSCH is an invalid PO. For example, in FIG. 12, the PO #0_0 and the PO #1_1 are invalid POs, and other POs are valid POs.

The preset condition includes:
the PUSCH occasion does not overlap any PRACH occasion; or
if the UE works in TDD mode, the PUSCH occasion does not overlap any PRACH occasion, and
2.1: all time-domain symbols of the PUSCH occasion are uplink symbols; or
2.2: in a configured PUSCH slot, the PUSCH occasion is not located before an SS/a PBCH block, and
a start symbol of the PUSCH occasion is located after the last downlink symbol, and is at least N1 symbols away from the last downlink symbol; the start symbol of the PUSCH occasion is located after a downlink symbol of a last SS/PBCH block, and is at least N2 symbols away from the downlink symbol of the last SS/PBCH block, where N1 and N2 are preset or configured by the network device and are integers greater than or equal to 0, and may be the same or different.

In addition to the foregoing preset condition, the preset condition may alternatively be another condition. This is not limited in this application.

The time window in the manner 8 is described by using relative relationships between various resources shown in FIG. 12. For example, the time-frequency resources used to send the preamble and the uplink data of the MsgA in step S520 are respectively the RO #0 and the PO #0_2. It can be learned from FIG. 12 that, in the valid POs (the PO #0_1 and the PO #0_2) associated with the RO #0, the PO #0_1 is the earliest valid PO. A2 is a time-domain end position (an end OFDM symbol or the last OFDM symbol) of the PO #0_1. CORESETs located after the position A2 include a CORESET #1 to a CORESET #5. A time-domain interval between the first OFDM symbol of the CORESET #1 and the position A2 is d4, and a time-domain interval between the first OFDM symbol of the CORESET #2 and the position A2 is d5. Assuming that the third threshold is a value ranging from d3 to d4, a start position of the first time window determined according to the manner 8 is the first OFDM symbol of the CORESET #2. That is, the first time window is a "#1 first time window" in FIG. 12, and starts from a position C2.

Manner 9: The first time window is started at the first OFDM symbol of a CORESET that first meets a fourth preset condition after the last valid PO associated with a PRACH slot in which the PRACH occasion is located ends. The fourth preset condition is that a time-domain interval between the first OFDM symbol of the CORESET and the last OFDM symbol of a PUSCH time-frequency resource of the last valid PO is greater than or equal to a fourth threshold. The fourth threshold is greater than or equal to 0, and may be the same as or different from the first threshold. In an embodiment, the PRACH occasion in the manner 9 is the PRACH occasion for sending the preamble in step S520. In an implementation, a PO associated with each PRACH slot may be determined with reference to the related descriptions in step S500, a valid PO is further determined according to the method for determining whether the PO is valid described in the manner 8, and then the last valid PO is determined in the valid PO. In another implementation, a valid PO associated with each PRACH occasion in one PRACH slot may be determined, and then the last valid PO is determined in the valid PO.

Figure 13:
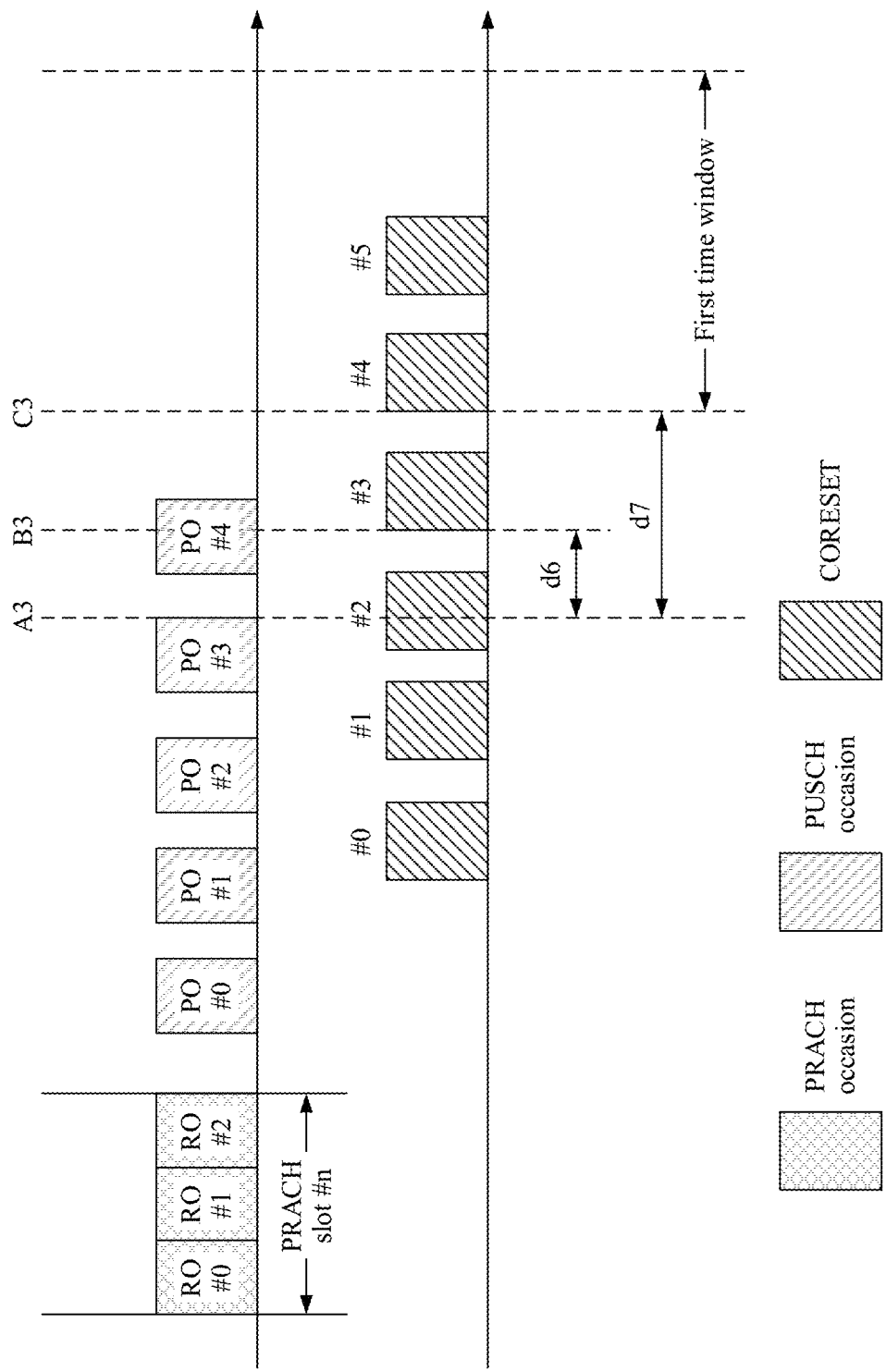
FIG. 13 is a schematic diagram of a position of still another first time window according to an embodiment of this application.

As shown in FIG. 13, the RO used to send the preamble in step S520 is an RO #1, and a PRACH slot in which the RO is located is a PRACH slot #n. POs that are associated with the PRACH slot #n and determined based on the configuration information of the PUSCH time-frequency resource are a PO #0, a PO #1, a PO #2, a PO #3, and a PO #4, where the PO #4 is an invalid PO and other POs are valid POs. The PO #3 is the last valid PO among the four valid POs associated with the PRACH slot #n, and A3 is a time-domain end position (an end OFDM symbol or the last OFDM symbol) of the PO #3. CORESETs located after the position A3 include a CORESET #3 to a CORESET #5. A time-domain interval between the first OFDM symbol of the CORESET #3 and the position A3 is d6, and a time-domain interval between the first OFDM symbol of the CORESET #4 and the position A7 is d5. Assuming that the fourth threshold is a value ranging from d6 to d7, a start position of the first time window determined according to the manner 9 is the first OFDM symbol of the CORESET #3. That is, the first time window is a "first time window" in FIG. 13, and starts from a position C3.

In an embodiment, if an RO used to send the preamble is not associated with (mapped to) a valid PO, the UE may send only the preamble. In this case, the UE may detect a random access response message for the preamble within the first time window (for example, the first time window in FIG. 12) determined in any of the foregoing nine manners other than the manner 4 and the manner 5.

In the implementations of starting the first time window in the manner 8 and the manner 9, if a plurality of UEs select a same RO to send preambles, the plurality of UEs may start the first time window at a same time point, to detect DCI used to schedule a PDSCH carrying random access response messages. The random access response messages for the plurality of UEs are carried in the same PDSCH, so that the network device may need to send only one piece of DCI, thereby saving resources.

Figure 7:
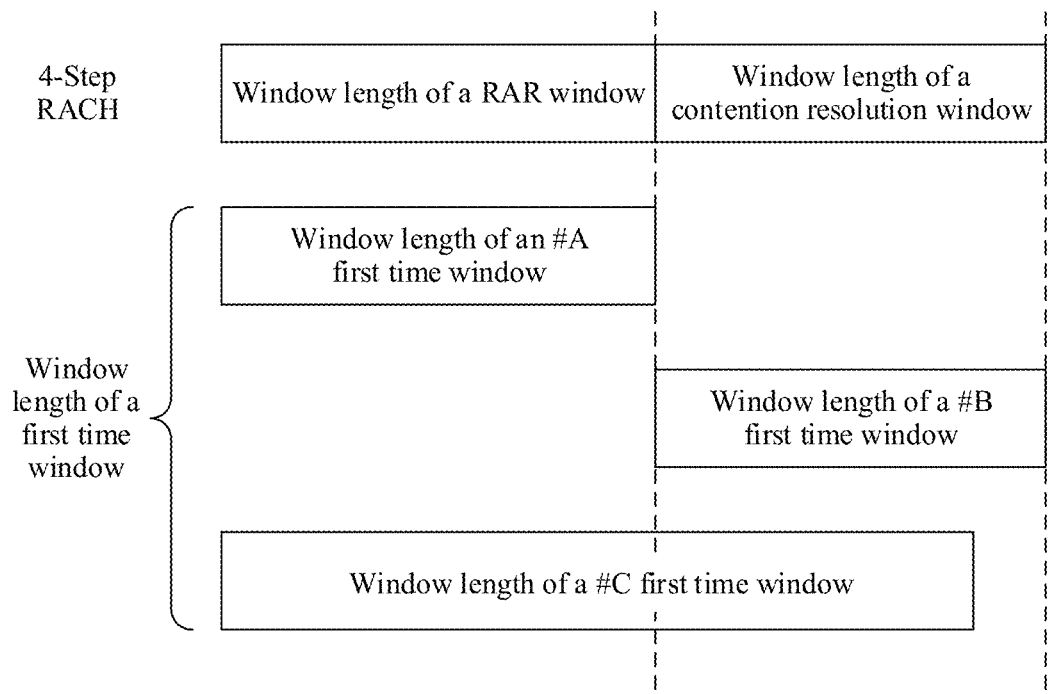
FIG. 7 is a schematic diagram of a window length of a time window according to an embodiment of this application.

In an embodiment, as shown in FIG. 7, the window length of the first time window may be: the window length of the RAR window, the window length of the contention resolution window, a maximum value in the window length of the RAR window and the window length of the contention resolution window, or a sum of the window length of the RAR window and the window length of the contention resolution window.

In some embodiments, if the PRACH time-frequency resource for sending the preamble in step S520 is a shared PRACH time-frequency resource of the 4-step RA procedure and the 2-step RA procedure, the window length of the first time window may be the same as the window length of the RAR window. If the PRACH time-frequency resource for sending the preamble in step S520 is not the shared PRACH time-frequency resource of the 4-step RA procedure and the 2-step RA procedure, the length of the first time window configured by the network device for the 2-step RA procedure is used.

In some embodiments, the configuration information of the two-step random access procedure in step 510 may further include the configuration information of the first time window, and the configuration information of the first time window may further be used to configure the window length of the first time window. In an implementation, the configuration information of the first time window includes configuration information of a window length increment, and the window length of the first time window is equal to the window length increment and the window length of the RAR time window. The first time window is configured by configuring the window length increment, to reduce signaling overheads.

In an embodiment, the time window may be implemented by using a timer. It may be understood that the time window may further include another implementation. This is not limited in this application.

In step 550, one of the following detecting results may occur: The second DCI is detected within the first time window, the first DCI is detected within the first time window, and neither the first DCI nor the second DCI is detected within the first time window.

The user equipment receives the second PDSCH based on the detected second DCI. In an embodiment, if the user equipment determines, based on the second response message carried in the second PDSCH, that contention access succeeds, the user equipment stops the first time window. In an implementation, the user equipment determines, based on the contention resolution information in the second response message, whether contention succeeds. If the contention resolution information carried in the second PDSCH matches information that is owned by the user equipment and used for contention resolution, the user equipment considers that random access (or random access) succeeds. In this application, "match" means that the two types of information are the same or meet a preset relationship. In some embodiments, if the contention resolution information carried in the second PDSCH does not match the information that is owned by the user equipment and used for contention resolution, the user equipment considers that the second response message carried in the second PDSCH is not a second message expected by the user equipment, and therefore, may discard or ignore the second response message.

In some embodiments, the user equipment receives the first PDSCH based on the detected first DCI, and obtains the first response message based on the received first PDSCH.

In an embodiment, if the first response message includes information indicating retransmission of the uplink data in the MsgA, the user equipment stops the first time window, retransmits the uplink data in the MsgA based on a UL grant carried in the first response message, and starts a first contention resolution window. A start position of the first contention resolution window may be the first OFDM symbol after retransmission of the uplink data in the MsgA ends, or may be another time domain position after retransmission of the uplink data in the MsgA ends. This is not limited in this application. A length of the first contention resolution window may be the same as the length of the first time window, or the same as the length of the contention resolution window of the 4-step RA procedure. Optionally, if the user equipment detects, within the first contention resolution window, the PDSCH carrying the contention resolution information, and determines that the contention resolution succeeds, the user equipment stops the first contention resolution window. Optionally, if the user equipment detects, within the first contention resolution window, DCI for scheduling retransmission of the uplink data in the MsgA, the user equipment restarts the first contention resolution window after retransmitting the uplink data in the MsgA based on the DCI. In this application, retransmission of the uplink data in the MsgA may be transmission of a part or all of the uplink data in the MsgA.

In some embodiments, if the first response message includes information indicating retransmission of the MsgA, the user equipment resends the MsgA, and restarts the first time window. Specifically, in one embodiment, a preamble in the resent MsgA may be the same as or different from the preamble sent in step 520; and uplink data in the resent MsgA may be completely or partially the same as the uplink data sent in step 520.

In some embodiments, if the first response message includes information indicating to roll back to the 4-step RA procedure, the user equipment stops detecting the DCI for scheduling transmission of the MsgB, stops the first time window, and switches to performing the 4-step RA procedure. In an implementation, switching to performing the 4-step RA procedure may be switching to sending a Msg1 of the 4-step RA procedure, or switching to sending a Msg3 of the 4-step RA procedure. If switching to sending the Msg3 of the 4-step RA procedure, the user equipment may send the Msg3 of the 4-step RA procedure based on the UL grant carried in the first response message.

In some embodiments, if the first time window expires, and the user equipment does not detect the first DCI or the second DCI, current random access fails.

Figure 8:
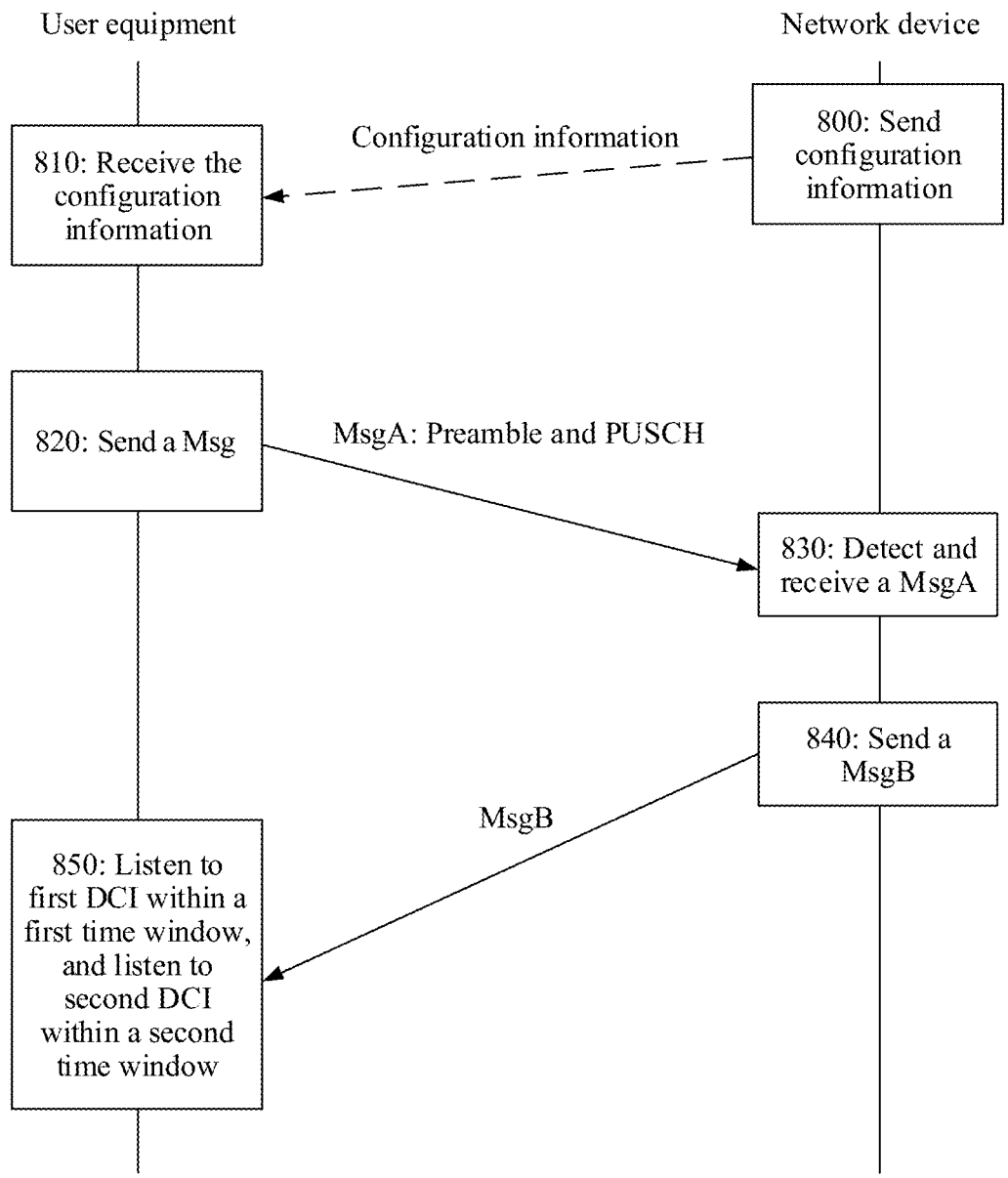
FIG. 8 is a schematic flowchart of another random access method according to an embodiment of this application.

FIG. 8 is a schematic flowchart of another random access method shown from a perspective of device interaction. As shown in FIG. 8, the method may include step 800 to step 850.

In this method, steps 800 to 840 are the same as step 500 to step 540 in the embodiment shown in FIG. 5, and details are not described herein again.

In one embodiment, in step 850, the user equipment detects first DCI within a second time window, and detects second DCI within a third time window.

In this step, the user equipment starts the second time window after sending the preamble in the MsgA, and detects the first DCI within the second time window. The user equipment starts the third time window after sending the PUSCH in the MsgA, and detects the second DCI within the third time window. After the second time window terminates, the user equipment stops detecting the first DCI. After the third time window terminates, the user equipment stops detecting the second DCI.

The following separately describes a starting position of the second time window and a starting position of the third time window.

The second time window is started in any of the following solutions:

A1: After transmission of the preamble in the MsgA ends, the user equipment immediately starts the second time window.

A2: The second time window is started at the first symbol of the first control resource set (CORESET) after transmission of the preamble in the MsgA ends.

A3: The second time window is started at the first OFDM symbol of a CORESET that first meets a first preset condition after transmission of the preamble in the MsgA ends. The first preset condition is that a time-domain interval between the first OFDM symbol of the CORESET and the last OFDM symbol of the PRACH time-frequency resource for sending the preamble is greater than or equal to a first threshold.

A4: The second time window is started at the first symbol of the first CORESET after transmission of the uplink data in the MsgA ends.

A5: The second time window is started at the first OFDM symbol of a CORESET that first meets a preset condition after transmission of the uplink data in the MsgA ends. A second preset condition is that a time-domain interval between the first OFDM symbol of the CORESET and the last OFDM symbol of the PUSCH time-frequency resource for sending the uplink data is greater than or equal to a second threshold.

A6: The starting position of the second time window is the same as the starting position of the third time window.

A7: The starting position of the second time window is determined based on whether the PRACH time-frequency resource used to send the preamble in step 820 is also used to send a preamble in a 4-step random access procedure. In an implementation, if the PRACH time-frequency resource for sending the preamble in step 520 is a shared PRACH time-frequency resource of the 4-step RA procedure and the 2-step RA procedure, the starting position of the second time window may be the same as a starting position of a RAR window of the 4-step RA procedure corresponding to the PRACH time-frequency resource. If the PRACH time-frequency resource used to send the preamble in step 820 is not a shared PRACH time-frequency resource of the 4-step RA procedure and the 2-step RA procedure, the starting position of the second time window may be the same as or different from a starting position of the RAR window of the 4-step RA procedure corresponding to the PRACH time-frequency resource.

A8: The start position of the second time window is determined based on configuration information that is of the second time window and that is from the network device. In this manner, the configuration information that is of the two-step random access procedure and that is sent by the network device may include the configuration information of the second time window, and the configuration information of the second time window may be used to configure the start position of the second time window. For a specific implementation method of configuring the second time window by using the configuration information sent by the network device, refer to the method for configuring the first time window by using the configuration information sent by the network device. Details are not described herein again.

The third time window is started in any of the following solutions:

B1: The second time window is started at the first symbol of the first CORESET after transmission of the uplink data in the MsgA ends.

B2: The second time window is started at the first OFDM symbol of a CORESET that first meets a preset condition after transmission of the uplink data in the MsgA ends. A second preset condition is that a time-domain interval between the first OFDM symbol of the CORESET and the last OFDM symbol of the PUSCH time-frequency resource for sending the uplink data is greater than or equal to a second threshold.

B3: The start position of the third time window is determined based on configuration information that is of the third time window and that is from the network device. In this manner, the configuration information that is of the two-step random access procedure and that is sent by the network device may include the configuration information of the third time window, and the configuration information of the third time window may be used to configure the start position of the third time window. For a specific implementation method of configuring the third time window by using the configuration information sent by the network device, refer to the method for configuring the first time window by using the configuration information sent by the network device. Details are not described herein again.

In an embodiment, a window length of the second time window may be: a window length of a RAR window, a window length of a time window that is configured by the network device and that is specially used to detect the first DCI in the 2-step RA procedure, or a sum of a window length of a RAR window and a first window length increment. The first window length increment may be configured by the network device, or may be preset (for example, predefined in a standard protocol). The network device configures the second time window by configuring the RAR window and the first window length increment, to reduce signaling overheads.

In some embodiments, a window length of the third time window may be: the window length of the second time window, a window length of a time window that is configured by the network device and that is specially used to detect the second DCI in the 2-step RA procedure, a window length of a contention resolution window, or a window length of a contention resolution window and a second window length increment. The first window length increment may be configured by the network device, or may be preset (for example, predefined in a standard protocol).

In an embodiment, if the user equipment detects the first DCI within the second time window and detects the second DCI within the third time window, and determines, based on a second response message, that contention resolution succeeds, the user equipment stops the second time window and the third time window. Optionally, if the user equipment cannot determine, based on the second response message, that the contention resolution succeeds, the user equipment considers that the received second response message is not a second response message expected by the user equipment, and may ignore or discard the received second response message and not change a current status of the second time window.

In some embodiments, if the user equipment detects the second DCI within the third time window and determines, based on the second response message, that the contention resolution succeeds, the user equipment stops the second time window and the third time window. Optionally, if the user equipment cannot determine, based on the second response message, that the contention resolution succeeds, the user equipment considers that the received second response message is not a second response message expected by the user equipment, and may ignore or discard the received second response message.

In an embodiment, if the user equipment receives the first DCI within the second time window, and a first response message received based on the first DCI includes information indicating retransmission of the uplink data in the MsgA, the user equipment stops the second time window, retransmits the uplink data in the MsgA based on a UL grant carried in the first response message, and restarts the third time window. Optionally, if the user equipment detects, within the third time window (the restarted third time window), a PDSCH carrying contention resolution information, and determines that the contention resolution succeeds, the user equipment stops the third time window. Optionally, if the user equipment detects, within the third time window, DCI for scheduling retransmission of the uplink data in the MsgA, the user equipment restarts the third time window after retransmitting the uplink data in the MsgA based on the DCI.

In some embodiments, if the user equipment detects the first DCI within the second time window, and the first response message includes information indicating retransmission of the MsgA, the user equipment resends the MsgA, and restarts the second time window and the third time window. Specifically, in one embodiment, a preamble in the resent MsgA may be the same as or different from the preamble sent in step 820; and uplink data in the resent MsgA may be completely or partially the same as the uplink data sent in step 820.

In some embodiments, if the user equipment detects the first DCI within the second time window, and the first response message includes information indicating to roll back to the 4-step RA procedure, the user equipment stops detecting DCI for scheduling transmission of the MsgB, stops the second time window and the third time window, and switches to performing the 4-step RA procedure. In an implementation, switching to performing the 4-step RA procedure may be switching to sending a Msg1 of the 4-step RA procedure, or switching to sending a Msg3 of the 4-step RA procedure. If switching to sending the Msg3 of the 4-step RA procedure, the user equipment may send the Msg3 of the 4-step RA procedure based on the UL grant carried in the first response message.

In some embodiments, if the user equipment does not detect the first DCI or the second DCI within the second time window and the third time window, current random access fails.

In this application, the user equipment may effectively detect the DCI for scheduling transmission of the MsgB. By starting, at a proper position, a time window for detecting the DCI, the user equipment may determine, based on response information, whether another time window needs to be started for a retransmission feedback. According to the solutions of this application, latency of the 2-step RA procedure can be reduced, and signaling overheads of the 2-step RA procedure and impact on a terminal performing the 4-step RA procedure are reduced.

Figure 9:
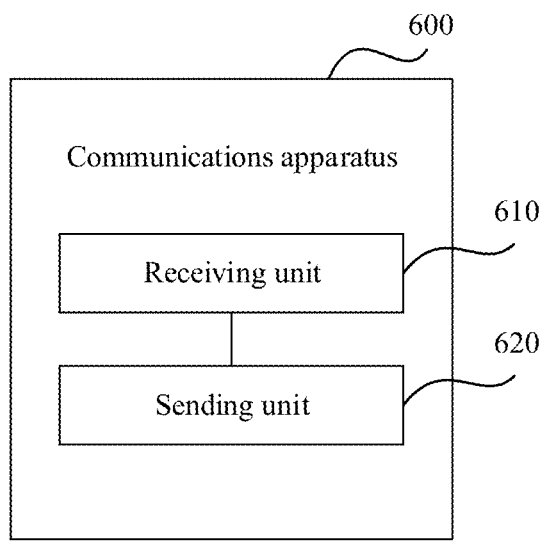
FIG. 9 is a schematic structural diagram of a communications apparatus according to an embodiment of this application.

FIG. 9 is a schematic structural diagram of a communications apparatus 600 according to this application. The communications apparatus 600 may be used for random access, and may also be referred to as a random access apparatus. The communications apparatus 600 includes a receiving unit 610 (e.g., a receiving circuit), a sending unit 620 (e.g., a sending circuit), and a processing unit (e.g., a processing circuit).

The apparatus shown in FIG. 9 may be configured to implement the random access method shown in FIG. 5, and specific implementations of the units of the apparatus are as follows.

The sending unit 620 is configured to send a random access message of a first-type random access procedure to a network device. The first message includes a random access preamble and uplink data.

The processing unit 630 is configured to start a first time window after transmission of the random access preamble ends.

The receiving unit 610 is configured to detect first downlink control information (DCI) and second DCI within the first time window. The first DCI is used to schedule a first physical downlink shared channel (PDSCH) for carrying a first response message for the random access preamble, and the second DCI is used to schedule a second PDSCH for carrying a second response message for the random access message.

Optionally, the processing unit 630 is configured to: start the first time window at the first symbol of a first control channel resource set, or start the first time window at the first symbol of a second control channel resource set. The first control channel resource set is the first control channel resource set after the transmission of the random access preamble ends, and the second control channel resource set is the first control channel resource set after transmission of the uplink data ends.

Optionally, the first control channel resource set is a control channel resource set that first meets a first preset condition after the transmission of the random access preamble ends; and/or the second control channel resource set is a control channel resource set that first meets a second preset condition after the transmission of the uplink data ends.

The first preset condition is that a time-domain interval between the first symbol of a control channel resource set and the last symbol of a time domain resource used to send the random access preamble is greater than a first time-domain length threshold.

The second preset condition is that a time-domain interval between the first symbol of a control channel resource set and the last symbol of a time domain resource used to send the uplink data is greater than a second time-domain length threshold.

Optionally, in one embodiment of this application, the receiving unit 610 is configured to:
receive configuration information of a second-type random access procedure from the network device, where the configuration information of the second-type random access procedure includes length configuration information of a random access response window and/or length configuration information of a first contention resolution window.

Optionally, a length of the first time window is the same as a length of the random access response window;
a length of the first time window is the same as a length of the first contention resolution window;
a length of the first time window is a sum of a length of the random access response window and a length of the first contention resolution window;
a length of the first time window is a maximum value in a length of the random access response window and a length of the first contention resolution window; or
a length of the first time window is a sum of a length of the random access window and a window length increment configured by the network device.

Optionally, the processing unit 630 is configured to: if a time-frequency resource used to send the random access preamble is also used to send a random access message of the second-type random access procedure, start the first time window at the first symbol of the first control channel resource set.

Optionally, the processing unit 630 is configured to: if the time-frequency resource used to send the random access preamble is also used to send a random access message of the second-type random access procedure, set the length of the first time window to be the same as the length of the random access response window or the length of the contention resolution window.

Optionally, if the first DCI is detected within the first time window and the first response message includes information used to indicate to retransmit the uplink data,
the processing unit 630 is configured to terminate the first time window;
the sending unit 620 is configured to retransmit the uplink data; and
the processing unit 630 is further configured to: after the retransmission of the uplink data ends, restart a second contention resolution window.

Optionally, if third DCI that is used to schedule a PDSCH carrying contention resolution information is detected within the second contention resolution window and it is determined, based on the contention resolution information, that contention resolution succeeds,
the processing unit 630 is configured to terminate the contention resolution window; and/or
if fourth DCI used to schedule retransmission of the uplink data is detected within the second contention resolution window,
the sending unit 620 is configured to retransmit the uplink data based on the fourth DCI; and
the processing unit 630 is configured to: after the retransmission of the uplink data ends, restart the second contention resolution window.

Optionally, if the first DCI is detected within the first time window and the first response message includes information used to indicate to resend the random access message of the first-type random access procedure, the sending unit 620 is configured to resend a second random access message of the first-type random access procedure, where the second random access message carries all or a part of the uplink data; and the processing unit 630 is configured to restart the first time window.

Optionally, if the first DCI is detected within the first time window and the first response message includes information used to indicate to roll back from the first-type random access procedure to the second-type random access procedure, the processing unit 630 is configured to: terminate the first time window, and trigger the apparatus to switch to performing the second-type random access procedure.

The apparatus shown in FIG. 9 may be configured to implement the random access method shown in FIG. 8, and specific implementations of the units of the apparatus are as follows.

The sending unit 620 is configured to send a random access message of a first-type random access procedure to a network device. The first message includes a random access preamble and uplink data.

The processing unit 630 is configured to: start a second time window after transmission of the random access preamble ends, and start a third time window after transmission of the uplink data ends.

The receiving unit 610 is configured to: detect first downlink control information (DCI) within the first time window, where the first DCI is used to schedule a first physical downlink shared channel (PDSCH) for carrying a first response message for the random access preamble; and detect second DCI within the second time window, where the second DCI is used to schedule a second PDSCH for carrying a second response message for the uplink data.

Optionally, the processing unit 630 is configured to: start the second time window at the first symbol of a first control channel resource set;
  start the second time window at the first symbol of a second control channel resource set; or
  start the first time window at a start position of the third time window.

The first control channel resource set is the first control channel resource set after the transmission of the random access preamble ends, and the second control channel resource set is the first control channel resource set after transmission of the uplink data ends.

Optionally, the first control channel resource set is a control channel resource set that first meets a first preset condition after the transmission of the random access preamble ends; and/or
  the second control channel resource set is a control channel resource set that first meets a second preset condition after the transmission of the uplink data ends.

The first preset condition is that a time-domain interval between the first symbol of a control channel resource set and the last symbol of a time domain resource used to send the random access preamble is greater than a first time-domain length threshold.

The second preset condition is that a time-domain interval between the first symbol of a control channel resource set and the last symbol of a time domain resource used to send the uplink data is greater than a second time-domain length threshold.

The first control channel resource set after the transmission of the random access preamble ends.

Optionally, in one embodiment of this application, the receiving unit 610 is configured to:

receive length configuration information of a contention resolution window of a second-type random access procedure from the network device, where
  a length of the third time window is the same as a length of the contention resolution window; or
  a length of the third time window is a sum of a length of the contention resolution window and a window length increment configured by the network device.

Optionally, the processing unit 630 is configured to:
  if the time-frequency resource used to send the random access preamble is also used to send a random access message of the second-type random access procedure, start the second time window at the first symbol of the first control channel resource set; and
  if the second DCI is detected and it is determined, based on the second response message, that contention resolution succeeds, terminate the second time window, and terminate the first time window if the first time window is not terminated when the second time window is terminated.

Optionally, if the first DCI is detected within the second time window and the first response message includes indication information indicating retransmission of the uplink data, the processing unit 630 is configured to stop the second time window, and the sending unit 620 is configured to retransmit the uplink data based on an uplink grant in the first response message. The unit 630 is further configured to restart the third time window after the uplink data is retransmitted.

Optionally, the receiving unit 610 is further configured to:
  detect the third DCI within the restarted second time window, where the third DCI is used to schedule a third PDSCH for carrying a third response message for retransmission of the uplink data; and
  if detecting the third DCI, receive the third PDSCH based on the third DCI, and obtain the third response message.

The processing unit 630 is further configured to: when the apparatus determines, based on a third response message, that the contention resolution succeeds, terminate the restarted second time window.

Optionally, the receiving unit 610 is further configured to receive length configuration information of a contention resolution window of the second-type random access procedure from the network device, where
  a length of the second time window is the same as a length of the random access response window; or
  a length of the second time window is a sum of a length of the random access response window and a window length increment configured by the network device.

Optionally, the processing unit 630 is configured to: if the time-frequency resource used to send the random access preamble is also used to send a random access message of the second-type random access procedure, start the first time window at the first symbol of the first control channel resource set.

Optionally, the processing unit 630 is configured to: if the time-frequency resource used to send the random access preamble is also used to send a random access message of the second-type random access procedure, set the length of the first time window to be the same as the length of the random access response window or the length of the contention resolution window.

Optionally, if the first DCI is detected within the second time window and the first response message includes information used to indicate to retransmit the uplink data, the processing unit 630 is configured to terminate the second time window:

the sending unit 620 is configured to retransmit the uplink data; and the processing unit 630 is further configured to: after the retransmission of the uplink data ends, restart the third time window.

Optionally, if the third DCI that is used to schedule the PDSCH carrying the contention resolution information is detected within the restarted third time window and it is determined, based on the contention resolution information, that the contention resolution succeeds.

the processing unit 630 is configured to terminate the third time window; and/or if fourth DCI used to schedule retransmission of the uplink data is detected within the third time window, the sending unit 620 is configured to retransmit the uplink data based on the fourth DCI; and the processing unit 630 is configured to: after the retransmission of the uplink data ends, restart the third time window.

Optionally, if the first DCI is detected within the second time window and the first response message includes information used to indicate to resend the random access message of the first-type random access procedure.

the sending unit 620 is configured to resend a second random access message of the first-type random access procedure, where the second random access message carries all or a part of the uplink data; and the processing unit 630 is configured to restart the first time window.

Optionally, if the first DCI is detected within the second time window and the first response message includes information used to indicate to roll back from the first-type random access procedure to the second-type random access procedure, the processing unit 630 is configured to: terminate the second time window, and trigger the apparatus to switch to performing the second-type random access procedure.

Optionally, if the fourth DCI is detected within the restarted third time window, and the fourth DCI is used to schedule retransmission of the uplink data, the sending unit 610 is further configured to retransmit the uplink data based on the fourth DCI, and the processing unit 630 is further configured to restart the third time window.

Optionally, if the first DCI is detected within the second time window and the first response message includes information used to indicate to resend the random access message of the first-type random access procedure, the sending unit is further configured to resend a second random access message of the first-type random access procedure, and the processing unit 630 is further configured to restart the second time window and the third time window. The second random access message carries all or a part of the uplink data.

Optionally, if the first DCI is detected within the second time window and the first response message includes information used to indicate to roll back from the first-type random access procedure to the second-type random access procedure, the control unit 620 is configured to: terminate the second time window and the third time window, and trigger the apparatus to switch to performing the second-type random access procedure.

Optionally, the receiving unit 610 and/or the sending unit 620 may also be collectively referred to as a transceiver unit (module) or a communications unit, and may be separately configured to perform the method embodiments and the receiving and sending steps of the user equipment in FIG. 5 or FIG. 8. Optionally, the processing unit is configured to: process an instruction sent by the sending unit, or process an instruction received by the receiving unit. The storage unit is configured to store instructions executed by the communications unit and the processing unit.

The communications apparatus 600 is user equipment, or may be a chip inside user equipment. When the communications apparatus is user equipment, the processing unit may be a processor, and the communications unit may be a transceiver. The communications device may further include a storage unit, and the storage unit may be a memory. The storage unit is configured to store an instruction, and the processing unit executes the instruction stored in the storage unit, to enable the communications device to perform the foregoing methods. When the communications apparatus is a chip inside user equipment, the processing unit may be a processor, and the communications unit may be an input/output interface, a pin, a circuit, or the like. The processing unit executes an instruction stored in a storage unit, to enable the communications apparatus to perform an operation performed by the user equipment in the foregoing method embodiments. The storage unit may be a storage unit (for example, a register or a cache) inside the chip, or may be a storage unit (for example, a read-only memory or a random access memory) outside the chip inside the user equipment.

It may be clearly understood by a person skilled in the art that, for steps performed by the communications apparatus 600 and corresponding beneficial effects, refer to related descriptions of the user equipment in the foregoing method embodiments. For brevity, details are not described herein again.

Figure 10:
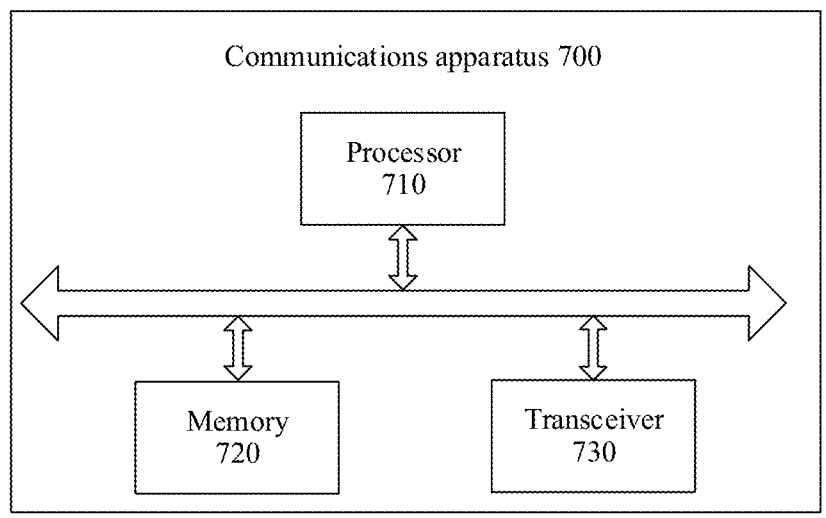
FIG. 10 is a schematic block diagram of another communications apparatus according to an embodiment of this application.

It should be understood that the receiving unit 610 and the sending unit 620 may be implemented by a transceiver. The processing unit may be implemented by a processor. The storage unit may be implemented by a memory. As shown in FIG. 10, a communications apparatus 700 may include a processor 710, a memory 720, and a transceiver 730. The communications apparatus 700 may be configured to perform random access, and may also be referred to as a random access apparatus.

The communications apparatus 600 shown in FIG. 9 or the communications apparatus 700 shown in FIG. 10 can implement the foregoing embodiments and the steps performed by the user equipment in FIG. 5 or FIG. 8. For similar descriptions, refer to the descriptions in the corresponding method. To avoid repetition, details are not described herein again.

The network device and the user equipment in the foregoing apparatus embodiments are corresponding to the user equipment and the network device in the method embodiments. A corresponding module or unit performs a corresponding step. For example, a communications unit (or a transceiver unit or a transceiver) performs a sending step and/or a receiving step in the method embodiments (or steps performed by a sending unit and a receiving unit), and another step other than the sending step and the receiving step may be performed by a processing unit (a processor). For a function of a specific unit, refer to a corresponding method embodiment. The sending unit and the receiving unit may form a transceiver unit, and a transmitter and a receiver may form a transceiver, to jointly implement receiving and sending functions in the method embodiments. There may be one or more processors.

It should be understood that division into the foregoing units is merely function division, and may be other division in an actual implementation.

The foregoing user equipment or network device may be a chip, and the processing unit may be implemented by using hardware or software. When the processing unit is implemented by using hardware, the processing unit may be a logic circuit, an integrated circuit, or the like. When the processing unit is implemented by using software, the processing unit may be a general-purpose processor, and is implemented by reading software code stored in a storage unit. The storage unit may be integrated into the processor, or may be located outside the processor and exist independently.

Figure 11:
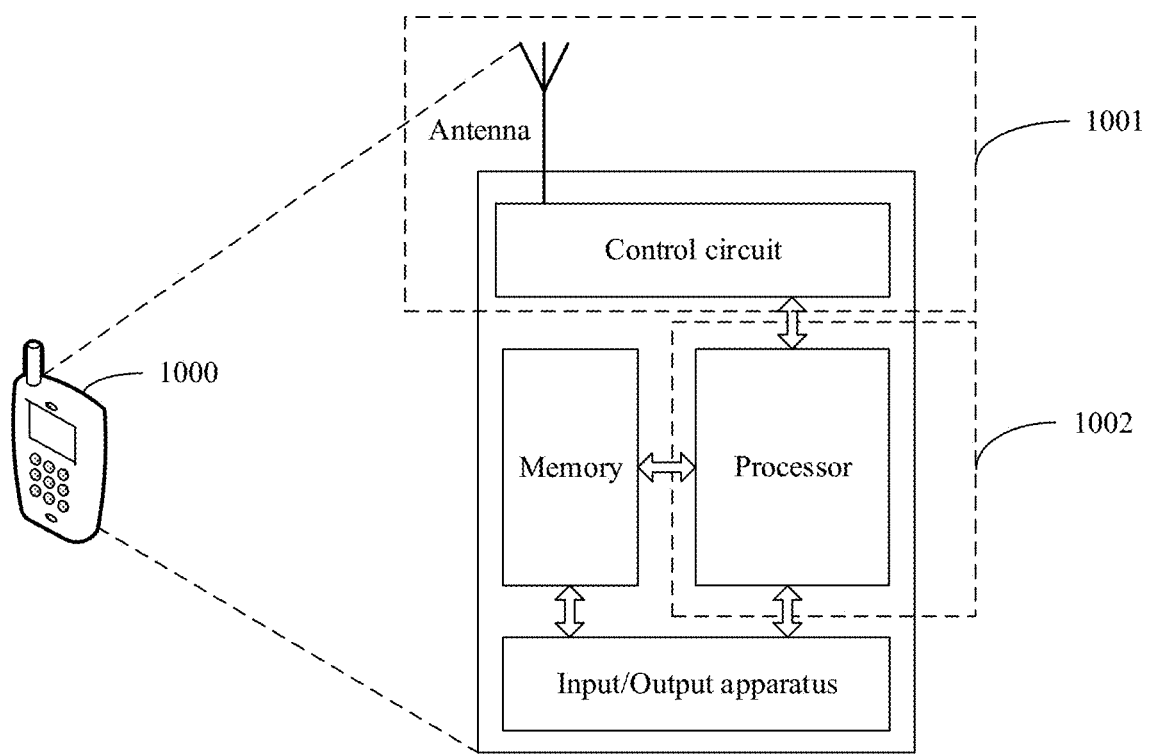
FIG. 11 is a schematic block diagram of still another communications apparatus according to an embodiment of this application.

FIG. 11 is a schematic structural diagram of user equipment 1000 according to this application. For ease of description, FIG. 11 shows only main parts of the user equipment. As shown in FIG. 11, the user equipment 1000 includes a processor, a memory, a control circuit, an antenna, and an input/output apparatus. The user equipment 1000 may be applied to the communications system described above, and perform a function of the user equipment in the foregoing method embodiments.

The processor is mainly configured to: process a communication protocol and communication data, control the entire user equipment, execute a software program, and process data of the software program, for example, configured to control the user equipment in performing the actions described in the foregoing method embodiments. The memory is mainly configured to store the software program and the data. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus, such as a touchscreen, a display, or a keyboard, is mainly configured to: receive data entered by a user and output data to the user.

After the user equipment is powered on, the processor may read a software program stored in a storage unit, explain and execute an instruction of the software program, and process data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends, by using the antenna, a radio frequency signal in an electromagnetic wave form. When data is sent to the user equipment, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that for ease of description, FIG. 11 shows only one memory and only one processor. In actual user equipment, there may be a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communications protocol and communication data. The central processing unit is mainly configured to: control the entire user equipment, execute a software program, and process data of the software program. The processor in FIG. 11 is integrated with functions of the baseband processor and the central processing unit. A person skilled in the art may understand that the baseband processor and the central processing unit may alternatively be independent processors, and are interconnected by using a technology such as a bus. A person skilled in the art may understand that the user equipment may include a plurality of baseband processors to adapt to different network standards, the user equipment may include a plurality of central processing units to enhance a processing capability of the user equipment, and components of the user equipment may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in the embodiment in FIG. 11, the antenna having a transceiver function and the control circuit may be considered as a transceiver unit 1001 of the user equipment 1000, and the processor having a processing function may be considered as a processing unit 1002 of the user equipment 1000. As shown in FIG. 11, the user equipment 1000 includes the transceiver unit 1001 and the processing unit 1002. The transceiver unit may also be referred to as a transceiver, a transceiver machine, a transceiver apparatus, or the like. Optionally, a component that is in the transceiver unit 1001 and that is configured to implement a receiving function may be considered as a receiving unit, and a component that is in the transceiver unit 1001 and that is configured to implement a sending function may be considered as a sending unit. In other words, the transceiver unit 1001 includes the receiving unit and the sending unit. For example, the receiving unit may also be referred to as a receiver, a receiver machine, a receiving circuit, or the like, and the sending unit may be referred to as a transmitter, a transmitter machine, a transmitting circuit, or the like.

The user equipment 1000 shown in FIG. 11 can implement each process of the user equipment in the method embodiment shown in FIG. 5 or FIG. 8. Operations and/or functions of modules in the user equipment 1000 are intended to implement corresponding procedures in the foregoing method embodiments. For details, refer to the descriptions in the foregoing method embodiments. To avoid repetition, detailed descriptions are properly omitted herein.

It should be understood that, the foregoing processing apparatus may be a chip. For example, the processing apparatus may be a field-programmable gate array (FPGA), an application-specific integrated chip (ASIC), a system on chip (SoC), a central processing unit (CPU), a network processor (NP), a digital signal processor (DSP), a micro controller (MCU), a programmable logic device (PLD), or another integrated chip.

In an implementation process, the steps of the methods in the embodiments may be performed by using a hardware integrated logical circuit in the processor, or by using instructions in a form of software. The steps of the methods disclosed with reference to the embodiments of this application may be directly performed by a hardware processor, or may be performed by a combination of hardware and software modules in the processor.

It should be noted that, the processor in the embodiments of this application may be an integrated circuit chip, and has a signal processing capability. In an implementation process, the steps in the foregoing method embodiments may be performed by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor in the embodiments of this application may implement or perform the methods, the steps, and the logical block diagrams that are disclosed in the embodiments of this application. The general-purpose processor may be a microprocessor, or the processor may be any conventional processor or the like.

It may be understood that the memory or the storage unit in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM, and is used as an external cache. Through examples rather than limitative descriptions, RAMs in many forms may be used, for example, a static random access memory (static RAM. SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM. SLDRAM), and a direct rambus random access memory (direct rambus RAM, DR RAM). It should be noted that the memories in the systems and methods described in this specification include but are not limited to these memories and any memory of another proper type.

An embodiment of this application further provides a communications system. The communications system includes the foregoing user equipment and network device.

An embodiment of this application further provides a computer-readable medium. The computer-readable medium stores a computer program, and when the computer program is executed by a computer, the method in any one of the foregoing embodiments is implemented.

An embodiment of this application further provides a computer program product. When the computer program product is executed by a computer, the method in any one of the foregoing embodiments is implemented.

An embodiment of this application further provides a system chip. The system chip includes a communications unit and a processing unit. The processing unit may be, for example, a processor. The communications unit may be, for example, an input/output interface, a pin, a circuit, or the like. The processing unit may execute computer instructions, so that a chip in the communications apparatus performs any method provided in the foregoing embodiments of this application.

Optionally, the computer instructions are stored in a storage unit.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded or executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

In this application. "at least one" means one or more, and "a plurality of" means two or more. The term "and/or" describes an association relationship for describing associated objects and represents that three relationships may exist. For example. A and/or B may represent the following cases: Only A exists, both A and B exist, and only B exists, where A and B may be singular or plural. The character "¦" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

It should be understood that "one embodiment" or "an embodiment" mentioned in the entire specification means that particular features, structures, or characteristics related to this embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

What is claimed is:

1. A random access method, comprising:
sending, by a terminal, a random access message of a first-type random access procedure to a network device, wherein the random access message of the first-type random access procedure comprises a random access preamble and uplink data; and
starting, by the terminal, a first window after transmission of the random access preamble ends for detecting first downlink control information (DCI) and second DCI within the first window, wherein the first DCI is used to schedule a first physical downlink shared channel (PDSCH) for carrying a first response message to the random access preamble, and the second DCI is used to schedule a second PDSCH for carrying a second response message to the random access message;

when the first DCI is detected within the first window, the first response message is received based on the first PDSCH scheduled by the first DCI, and the first response message comprises information indicating to retransmit the uplink data, terminating, by the terminal, the first window, and retransmitting the uplink data; and after the retransmission of the uplink data ends, starting, by the terminal, a second contention resolution window.

2. The method according to claim 1, wherein the terminal starts the first window at the first symbol of a second control channel resource set, wherein the second control channel resource set is a control channel resource set after transmission of the uplink data ends.

3. The method according to claim 2, the second control channel resource set is a control channel resource set that meets a second preset condition after the transmission of the uplink data ends, wherein the second preset condition is that a time-domain interval between the first symbol of a control channel resource set and the last symbol of a time domain resource used to send the uplink data is greater than a second time-domain length threshold.

4. The method according to claim 2, wherein if a time-frequency resource used to send the random access preamble is also used to send a random access message of a second-type random access procedure, the terminal starts the first window at the first symbol of the first control channel resource set.

5. The method according to claim 1, wherein the terminal starts the first window at the first symbol of a third control channel resource set, or the terminal starts the first window at the first symbol of a fourth control channel resource set, wherein the third control channel resource set is a control channel resource set that meets a third preset condition and that is after the earliest valid physical uplink shared channel time-frequency resource associated with a physical random access channel time-frequency resource used to send the random access preamble; and the fourth control channel resource set is a control channel resource set that meets a fourth preset condition and that is after the last valid physical uplink shared channel time-frequency resource associated with a slot of a physical random access channel time-frequency resource used to send the random access preamble, wherein the third preset condition is that a time-domain interval between the first symbol of a control channel resource set and the last orthogonal frequency-division multiplexing (OFDM) symbol of the earliest valid physical uplink shared channel time-frequency resource is greater than or equal to a third threshold; and the fourth preset condition is that a time-domain interval between the first symbol of a control channel resource set and the last OFDM symbol of the last valid physical uplink shared channel time-frequency resource is greater than or equal to a fourth threshold.

6. The method according to claim 1, wherein the method further comprises:

receiving, by the terminal, configuration information of a second-type random access procedure from the network device, wherein the configuration information of the second-type random access procedure comprises length configuration information of a random access response window and/or length configuration information of a first contention resolution window, wherein a length of the first window is the same as a length of the random access response window;

a length of the first window is the same as a length of the first contention resolution window;

a length of the first window is a sum of a length of the random access response window and a length of the first contention resolution window;

a length of the first window is a maximum value in a length of the random access response window and a length of the first contention resolution window; or a length of the first window is a sum of a length of the random access window and a window length increment configured by the network device.

7. The method according to claim 6, wherein if the time-frequency resource used to send the random access preamble is also used to send a random access message of the second-type random access procedure, the length of the first window is the same as the length of the random access response window or the length of the first contention resolution window.

8. The method according to claim 7, wherein the method further comprises:

if third DCI that is used to schedule a PDSCH carrying contention resolution information is detected within a second contention resolution window and it is determined, based on the contention resolution information, that contention resolution succeeds, terminating, by the terminal, the second contention resolution window; and/or if fourth DCI that is used to schedule retransmission of the uplink data is detected within the second contention resolution window, retransmitting, by the terminal, the uplink data based on the fourth DCI, and restarting the second contention resolution window after the retransmission of the uplink data ends.

9. The method according to claim 1, wherein the method further comprises:

if the first DCI is detected within the first window and the first response message comprises information indicating to resend the random access message of the first-type random access procedure, resending, by the terminal, a second random access message of the first-type random access procedure, and restarting the first window, wherein the second random access message carries all or a part of the uplink data.

10. A communications apparatus, comprising:

a sending circuit, configured to send a random access message of a first-type random access procedure to a network device, wherein the random access message of the first-type random access procedure comprises a random access preamble and uplink data;

a processing circuit, configured to start a first window after transmission of the random access preamble ends; and a receiving circuit, configured to:

detect first downlink control information (DCI) and second DCI within the first window, wherein the first DCI is used to schedule a first physical downlink shared channel (PDSCH) that carries a first response message to the random access preamble, and the second DCI is used to schedule a second PDSCH that carries a second response message to the random access message;

wherein when the first DCI is detected within the first window, the first response message is received based on the first PDSCH scheduled by the first DCI, and the first response message comprises information indicating to retransmit the uplink data, the processing circuit is configured to terminate the first window and the sending circuit is configured to retransmit the uplink data, and after the retransmission of the uplink data ends, the processing circuit is further configured to start a second contention resolution window.

11. The apparatus according to claim 10, wherein the processing circuit is configured to start the first window at the first symbol of a second control channel resource set, wherein the second control channel resource set is a control channel resource set after transmission of the uplink data ends.

12. The apparatus according to claim 11, wherein
the second control channel resource set is a control channel resource set that meets a second preset condition after the transmission of the uplink data ends, wherein
the second preset condition is that a time-domain interval between the first symbol of a control channel resource set and the last symbol of a time domain resource used to send the uplink data is greater than a second time-domain length threshold.

13. The apparatus according to claim 11, wherein the processing circuit is further configured to:
if a time-frequency resource used to send the random access preamble is also used to send a random access message of a second-type random access procedure, start the first window at the first symbol of the first control channel resource set.

14. The apparatus according to claim 10, wherein the processing circuit is configured to start the first window at the first symbol of a third control channel resource set, or start the first window at the first symbol of a fourth control channel resource set, wherein
the third control channel resource set is a control channel resource set that meets a third preset condition and that is after the earliest valid physical uplink shared channel time-frequency resource associated with a physical random access channel time-frequency resource used to send the random access preamble; and
the fourth control channel resource set is a control channel resource set that meets a fourth preset condition and that is after the last valid physical uplink shared channel time-frequency resource associated with a slot of a physical random access channel time-frequency resource used to send the random access preamble, wherein
the third preset condition is that a time-domain interval between the first symbol of a control channel resource set and the last orthogonal frequency-division multiplexing (OFDM) symbol of the earliest valid physical uplink shared channel time-frequency resource is greater than or equal to a third threshold; and
the fourth preset condition is that a time-domain interval between the first symbol of a control channel resource set and the last OFDM symbol of the last valid physical uplink shared channel time-frequency resource is greater than or equal to a fourth threshold.

15. The apparatus according to claim 10, wherein the receiving circuit is further configured to receive configuration information of a second-type random access procedure from the network device, wherein the configuration information of the second-type random access procedure comprises length configuration information of a random access response window and/or length configuration information of a first contention resolution window, wherein
a length of the first window is the same as a length of the random access response window;
a length of the first window is the same as a length of the first contention resolution window;
a length of the first window is a sum of a length of the random access response window and a length of the first contention resolution window;
a length of the first window is a maximum value in a length of the random access response window and a length of the first contention resolution window; or
a length of the first window is a sum of a length of the random access window and a window length increment configured by the network device.

16. The apparatus according to claim 15, wherein the processing circuit is further configured to:
if the time-frequency resource used to send the random access preamble is also used to send a random access message of the second-type random access procedure, set the length of the first window to be the same as the length of the random access response window or the length of the first contention resolution window.

17. The apparatus according to claim 16, wherein
if third DCI that is used to schedule a PDSCH carrying contention resolution information is detected within a second contention resolution window and it is determined, based on the contention resolution information, that contention resolution succeeds, the processing circuit is further configured to terminate the second contention resolution window; and/or
if fourth DCI that is used to schedule retransmission of the uplink data is detected within the second contention resolution window, the sending circuit is further configured to retransmit the uplink data based on the fourth DCI, and the processing circuit is further configured to restart the second contention resolution window after the retransmission of the uplink data ends.

18. A non-transitory computer storage medium, storing program code, wherein when the program code is executed by a communications apparatus, the communications apparatus is enabled to perform the method according to claim 1.

* * * * *